US012593327B2

(12) United States Patent
Cheng et al.

(10) Patent No.: US 12,593,327 B2
(45) Date of Patent: Mar. 31, 2026

(54) METHODS OF SCHEDULING WITH INACTIVITY IN SIDELINK UNICAST

(71) Applicant: QUALCOMM Incorporated, San Diego, CA (US)

(72) Inventors: Hong Cheng, Basking Ridge, NJ (US); Zhibin Wu, Los Altos, CA (US); Kapil Gulati, Hillsborough, NJ (US); Junyi Li, Chester, NJ (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 16/995,505

(22) Filed: Aug. 17, 2020

(65) Prior Publication Data

US 2021/0058941 A1 Feb. 25, 2021

Related U.S. Application Data

(60) Provisional application No. 62/891,183, filed on Aug. 23, 2019.

(51) Int. Cl.
*H04W 72/121* (2023.01)
*H04L 5/18* (2006.01)
(Continued)

(52) U.S. Cl.
CPC ............. *H04W 72/121* (2013.01); *H04L 5/18* (2013.01); *H04W 72/12* (2013.01); *H04W 76/14* (2018.02)

(58) Field of Classification Search
CPC ... H04W 72/121; H04W 76/14; H04W 28/08; H04L 5/18
See application file for complete search history.

(56) References Cited

U.S. PATENT DOCUMENTS

| 9,295,096 B1 | 3/2016 | Shukla | |
| 10,764,866 B2 * | 9/2020 | Loehr | ................... H04W 72/56 |

(Continued)

FOREIGN PATENT DOCUMENTS

| WO | WO-2018089372 | 5/2018 |
| WO | WO-2019138157 A1 | 7/2019 |

OTHER PUBLICATIONS

International Search Report and Written Opinion—PCT/US2020/046785—ISA/EPO—Oct. 30, 2020.

(Continued)

*Primary Examiner* — Faruk Hamza
*Assistant Examiner* — Tito Q Pham
(74) *Attorney, Agent, or Firm* — Holland & Hart LLP

(57) ABSTRACT

Methods, systems, and devices for wireless communications are described. A method may include identifying, by a first user equipment (UE), a schedule associated with the first UE and a second UE of the group of UEs in direct communications with the first UE. The schedule may include an awake period reserved for directional communications between the first UE and the second UE. The first UE may manage the awake period reserved for the directional communications based on traffic information associated with the first UE, and may communicate with the second UE in accordance with the managing. The awake period reserved for directional communications may include an awake period reserved for uni-directional communications or an awake period reserved for bi-directional communications.

58 Claims, 13 Drawing Sheets

(51) Int. Cl.
_H04W 72/12_ (2023.01)
_H04W 76/14_ (2018.01)
_H04W 72/14_ (2009.01)

(56) References Cited

U.S. PATENT DOCUMENTS

| | | | | |
|---|---|---|---|---|
| 10,869,266 | B2 | 12/2020 | Gupta et al. | |
| 10,869,271 | B2* | 12/2020 | Jeong | H04W 52/0235 |
| 2009/0274082 | A1* | 11/2009 | Wentink | H04W 52/0216 |
| | | | | 370/311 |
| 2015/0365997 | A1* | 12/2015 | Jeong | H04W 52/0251 |
| | | | | 370/311 |
| 2016/0007292 | A1 | 1/2016 | Weng et al. | |
| 2016/0014693 | A1* | 1/2016 | Patil | H04W 72/0446 |
| | | | | 370/254 |
| 2016/0286574 | A1* | 9/2016 | Abraham | H04W 72/12 |
| 2016/0286601 | A1 | 9/2016 | Siomina et al. | |
| 2017/0188411 | A1* | 6/2017 | Siomina | H04W 76/27 |
| 2018/0109952 | A1* | 4/2018 | Abraham | H04W 12/50 |
| 2018/0184427 | A1 | 6/2018 | Huang et al. | |
| 2018/0234977 | A1* | 8/2018 | Yasukawa | H04W 48/16 |
| 2019/0090198 | A1* | 3/2019 | Zhao | H04W 76/14 |
| 2020/0304968 | A1* | 9/2020 | Lee | H04W 4/40 |
| 2020/0344684 | A1* | 10/2020 | Rantala | H04W 52/02 |
| 2021/0014791 | A1* | 1/2021 | Freda | H04W 52/0229 |
| 2021/0058219 | A1* | 2/2021 | Kimura | H04L 5/14 |
| 2021/0219268 | A1* | 7/2021 | Li | H04L 1/08 |
| 2021/0337467 | A1* | 10/2021 | Li | H04W 76/28 |
| 2022/0039080 | A1* | 2/2022 | Khoryaev | H04W 4/025 |

OTHER PUBLICATIONS

European Search Report—EP24194446—Search Authority—The Hague—Nov. 11, 2024.

* cited by examiner

Sidelink Communications 205

Update Message 210

Downlink Communications 215

310

315

115-f

305

315

305

315

305

115-e 115-g

315

305

115-d

315

305

305 315

115-h 115-i

| | Sidelink Communications 3<u>05</u> |
| --- | --- |
| | Update Message <u>310</u> |

300

115-j 115-k

505 Identify
Schedule

Identify
Schedule 510

515 Update Request Message

Update Response Message 520

525 Manage
Awake
Period(s)

Manage
Awake
Period(s) 530

Data Communication

535

500

610

615

620

605

600

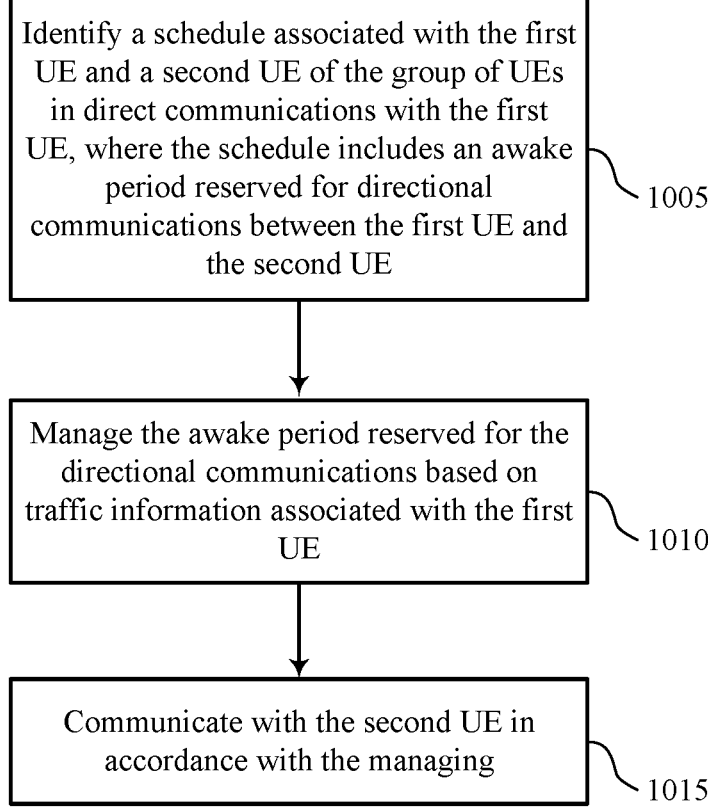

Identify a schedule associated with the first UE and a second UE of the group of UEs in direct communications with the first UE, where the schedule includes an awake period reserved for directional communications between the first UE and the second UE

1005

Manage the awake period reserved for the directional communications based on traffic information associated with the first UE

1010

Communicate with the second UE in accordance with the managing

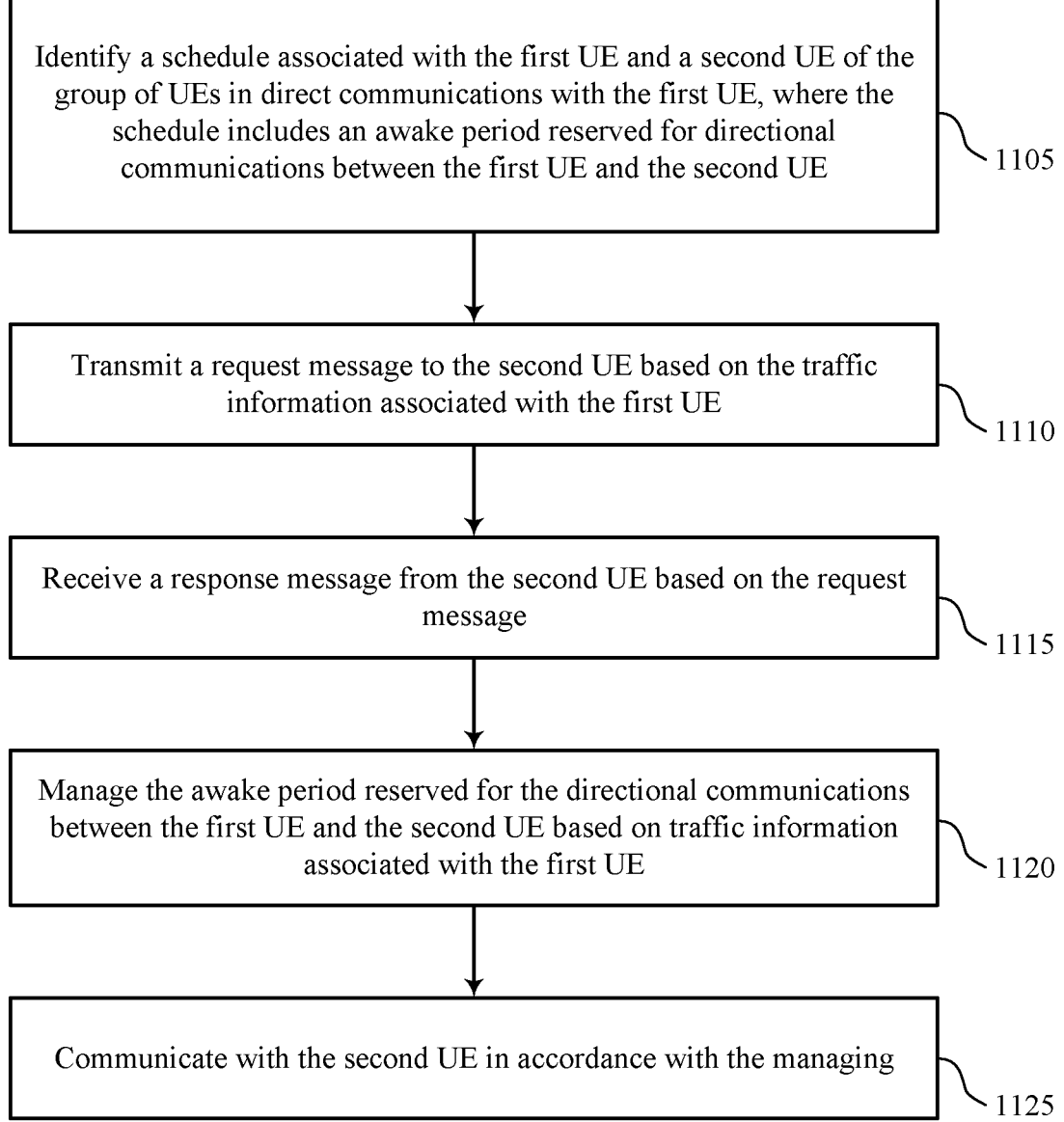

Identify a schedule associated with the first UE and a second UE of the group of UEs in direct communications with the first UE, where the schedule includes an awake period reserved for directional communications between the first UE and the second UE

1105

Transmit a request message to the second UE based on the traffic information associated with the first UE

1110

Receive a response message from the second UE based on the request message

1115

Manage the awake period reserved for the directional communications between the first UE and the second UE based on traffic information associated with the first UE

1120

Communicate with the second UE in accordance with the managing

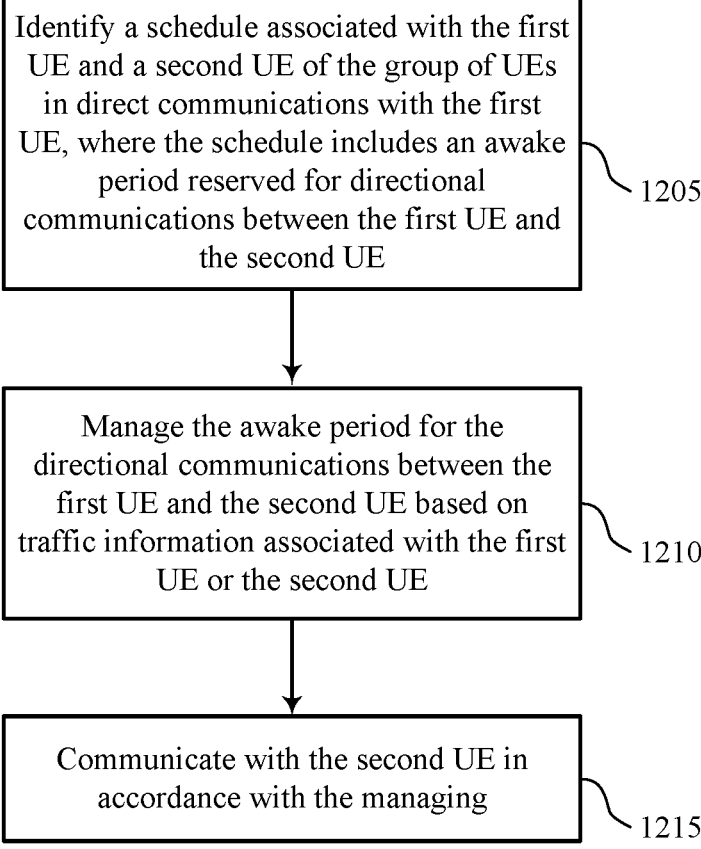

Identify a schedule associated with the first UE and a second UE of the group of UEs in direct communications with the first UE, where the schedule includes an awake period reserved for directional communications between the first UE and the second UE

1205

Manage the awake period for the directional communications between the first UE and the second UE based on traffic information associated with the first UE or the second UE

1210

Communicate with the second UE in accordance with the managing

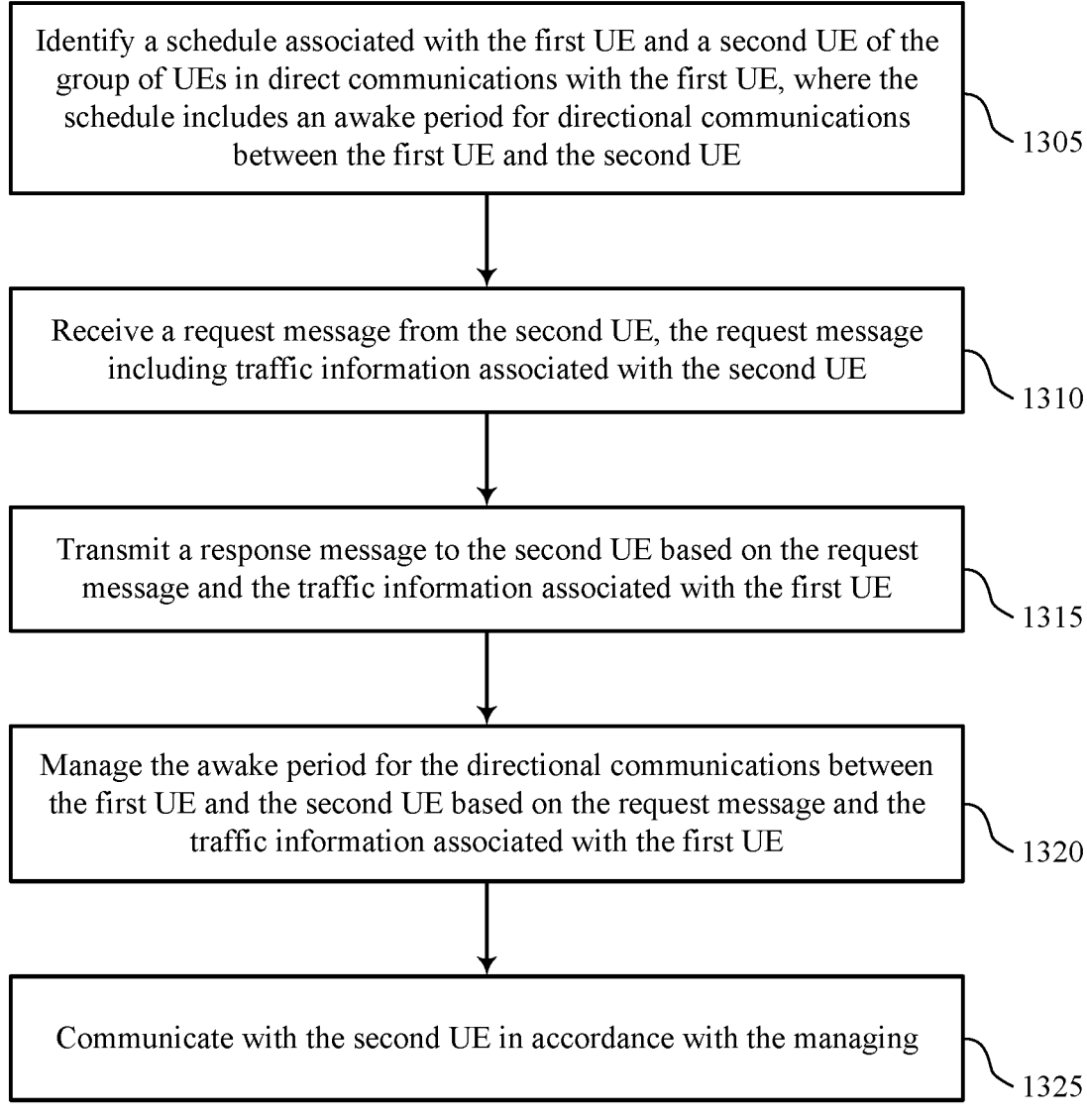

Identify a schedule associated with the first UE and a second UE of the group of UEs in direct communications with the first UE, where the schedule includes an awake period for directional communications between the first UE and the second UE
1305

Receive a request message from the second UE, the request message including traffic information associated with the second UE
1310

Transmit a response message to the second UE based on the request message and the traffic information associated with the first UE
1315

Manage the awake period for the directional communications between the first UE and the second UE based on the request message and the traffic information associated with the first UE
1320

Communicate with the second UE in accordance with the managing
1325

METHODS OF SCHEDULING WITH INACTIVITY IN SIDELINK UNICAST

CROSS REFERENCE

The present application for patent claims the benefit of U.S. Provisional Patent Application No. 62/891,183 by WU et al., entitled "METHODS OF SCHEDULING WITH INACTIVITY IN SIDELINK UNICAST," filed Aug. 23, 2019, assigned to the assignee hereof, and expressly incorporated by reference herein.

FIELD OF TECHNOLOGY

The following relates generally to wireless communications, and more specifically to methods of scheduling with inactivity in sidelink unicast.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or a both. A sidelink is a communication link between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In such systems, efficient power saving techniques may be desirable.

SUMMARY

The described techniques relate to improved methods, systems, devices, and apparatuses that support methods of scheduling with inactivity in sidelink unicast. Techniques for device-to-device communications among devices (e.g., user equipment (UEs)) are proposed that ensure reliable communications as well as power savings. A UE and an additional UE of a group of UEs may be in direct communications (e.g., via a sidelink). A schedule associated with the UEs may include an awake period reserved for directional communications between the UE to the additional UE. For example, the schedule may include an awake period reserved for uni-directional communications from the UE to the additional UE (or from the additional UE to the UE) or an awake period reserved for bi-directional communications between the UE and the additional UE. The UE may identify the schedule and manage the awake period reserved for directional communications between the UE to the additional UE.

For example, the UE may manage the awake period reserved for directional communications (e.g., manage one or more of the awake period reserved for the uni-directional communications or the awake period reserved for the bi-directional communications). In some cases, the UE may manage one or more of the awake periods based on traffic information (e.g., a traffic load, an inactivity) associated with the UE. In some examples, the UE may transmit a request message to the additional UE based the traffic information associated with the UE. In some cases, the UE may receive an response message from the additional UE and manage one or more of the awake periods based on the response message. The response message may include an acknowledgement (e.g., an accept message) or a non-acknowledgement (e.g., a reject message) and an associated reason with respect to the response.

A method of wireless communications at a first UE of a group of UEs is described. The method may include identifying a schedule associated with the first UE and a second UE of the group of UEs in direct communications with the first UE, where the schedule includes an awake period reserved for directional communications between the first UE and the second UE (e.g., an awake period reserved for uni-directional communications from the first UE to the second UE, or an awake period reserved for bi-directional communications between the first UE and the second UE, or a combination thereof), managing the awake period reserved for the directional communications based on traffic information associated with the first UE, and communicating with the second UE in accordance with the managing.

A first apparatus of a group of apparatuses for wireless communications is described. The first apparatus may include a processor, memory coupled with the processor, and instructions stored in the memory. The instructions may be executable by the processor to cause the first apparatus to identify a schedule associated with the first apparatus and a second apparatus of the group of apparatuses in direct communications with the first apparatus, where the schedule includes an awake period reserved for directional communications between the first apparatus and the second apparatus (e.g., an awake period reserved for uni-directional communications from the first apparatus to the second apparatus, or an awake period reserved for bi-directional communications between the first apparatus and the second apparatus, or a combination thereof), manage the awake period reserved for the directional communications based on traffic information associated with the first apparatus, and communicate with the second apparatus in accordance with the managing.

A first apparatus of a group of apparatuses for wireless communications is described. The first apparatus may include means for identifying a schedule associated with the first apparatus and a second apparatus of the group of apparatuses in direct communications with the first apparatus, where the schedule includes an awake period reserved for directional communications between the first apparatus and the second apparatus (e.g., an awake period reserved for uni-directional communications from the first apparatus to the second apparatus, or an awake period reserved for bi-directional communications between the first apparatus and the second apparatus, or a combination thereof), managing the awake period reserved for the directional communications based on traffic information associated with the first apparatus, and communicating with the second apparatus in accordance with the managing.

A non-transitory computer-readable medium storing code for wireless communications at a first UE of a group of UEs is described. The code may include instructions executable by a processor to identify a schedule associated with the first UE and a second UE of the group of UEs in direct communications with the first UE, where the schedule includes an awake period reserved for directional communications between the first UE and the second UE (e.g., an awake period reserved for uni-directional communications from the first UE to the second UE, or an awake period reserved for bi-directional communications between the first UE and the second UE, or a combination thereof), manage the awake period reserved for the directional communications based on traffic information associated with the first UE, and communicate with the second UE in accordance with the managing.

Some examples of the method, apparatuses, and non-transitory computer-readable medium described herein may further include operations, features, means, or instructions for transmitting a request message to the second UE based on the traffic information associated with the first UE, and receiving an response message from the second UE based on the request message, and where managing the awake period reserved for the directional communications may be based on the response message.

In some examples of the method, apparatuses, and non-transitory computer-readable medium described herein, one or more of the request message or the response message may be a PC5 radio resource control message.

In some examples of the method, apparatuses, and non-transitory computer-readable medium described herein, one or more of the request message or the response message may be a medium access control-control element message.

In some examples of the method, apparatuses, and non-transitory computer-readable medium described herein, the request message includes an indication of a number of cycles associated with modifying the awake period reserved for the directional communications.

Some examples of the method, apparatuses, and non-transitory computer-readable medium described herein may further include operations, features, means, or instructions for determining that a traffic load associated with the first UE satisfies a threshold based on the traffic information, where managing the awake period reserved for the directional communications may be based on the traffic load satisfying the threshold, and including a cause indication in the request message based on the determining, the cause indication indicating that the traffic load associated with the first UE satisfies the threshold, where transmitting the request message to the second UE includes transmitting, to the second UE, the request message carrying the cause indication.

In some examples of the method, apparatuses, and non-transitory computer-readable medium described herein, determining that the traffic load associated with the first UE satisfies the threshold may include operations, features, means, or instructions for comparing the traffic load associated with the first UE to a predicted traffic load associated with the first UE, and where managing the awake period reserved for the directional communications may be based on the comparing.

Some examples of the method, apparatuses, and non-transitory computer-readable medium described herein may further include operations, features, means, or instructions for including, in the request message, an indication to remove the awake period reserved for the directional communications (e.g., the awake period reserved for the uni-directional communications) based on the traffic information, where communicating with the second UE may be based on the indication.

Some examples of the method, apparatuses, and non-transitory computer-readable medium described herein may further include operations, features, means, or instructions for including, in the request message, an indication to modify the awake period reserved for the directional communications (e.g., modify the awake period reserved for the uni-directional communications) based on the traffic information, where communicating with the second UE may be based on the indication.

Some examples of the method, apparatuses, and non-transitory computer-readable medium described herein may further include operations, features, means, or instructions for assigning bit-value to a field in the request message, where the bit-value corresponds to the duration of the awake period reserved for the directional communications (e.g., a duration of an awake period reserved for the uni-directional communications).

Some examples of the method, apparatuses, and non-transitory computer-readable medium described herein may further include operations, features, means, or instructions for including, in the request message, an indication to remove or modify the awake period reserved for the directional communications (e.g., remove or modify the awake period reserved for the bi-directional communications) based on the traffic information, where communicating with the second UE may be based on the indication.

Some examples of the method, apparatuses, and non-transitory computer-readable medium described herein may further include operations, features, means, or instructions for assigning bit-value to a field in the request message, where the bit-value corresponds to the duration of the awake period reserved for the directional communications (e.g., an awake period reserved for the bi-directional communications).

Some examples of the method, apparatuses, and non-transitory computer-readable medium described herein may further include operations, features, means, or instructions for including, in the request message, an indication to allocate the awake period reserved for the directional communications (e.g., an awake period reserved for the bi-directional communications) exclusively to the second UE based on the traffic information, where communicating with the second UE may be based on the indication.

In some examples of the method, apparatuses, and non-transitory computer-readable medium described herein, the awake period reserved for directional communications may include an awake period reserved for uni-directional communications from the first UE to the second UE or an awake period reserved for bi-directional communications between the first UE and the second UE. The awake period reserved for the bi-directional communications may be shared between the first UE and the second UE, and the awake period reserved for the uni-directional communications may be unshared between the first UE and the second UE.

Some examples of the method, apparatuses, and non-transitory computer-readable medium described herein may further include operations, features, means, or instructions for receiving, from the second UE, an indication to allocate the awake period reserved for the directional communications (e.g., an awake period reserved for the bi-directional communications) exclusively to the first UE, where communicating with the second UE may be based on the indication.

A method of wireless communications at a first UE of a group of UEs is described. The method may include identifying a schedule associated with the first UE and a second UE of the group of UEs in direct communications with the first UE, where the schedule includes an awake period reserved for directional communications between the first UE and the second UE (e.g., awake periods reserved for uni-directional communications from the first UE to the second UE or from the second UE to the first UE, or an awake period reserved for bi-directional communications between the first UE and the second UE, or a combination thereof), managing the awake period reserved for the directional communications based on traffic information associated with the first UE or the second UE, and communicating with the second UE in accordance with the managing.

A first apparatus of a group of apparatuses for wireless communications is described. The first apparatus may include a processor, memory coupled with the processor, and instructions stored in the memory. The instructions may be executable by the first processor to cause the first apparatus to identify a schedule associated with the first apparatus and a second apparatus of the group of apparatuses in direct communications with the first apparatus, where the schedule includes an awake period reserved for directional communications between the first apparatus and the second apparatus (e.g., awake periods reserved for uni-directional communications from the first apparatus to the second apparatus or from the second apparatus to the first apparatus, or an awake period reserved for bi-directional communications between the first apparatus and the second apparatus, or a combination thereof), manage the awake period reserved for the directional communications based on traffic information associated with the first apparatus or the second apparatus, and communicate with the second apparatus in accordance with the managing.

A first apparatus of a group of apparatuses for wireless communications is described. The first apparatus may include means for identifying a schedule associated with the first apparatus and a second apparatus of the group of apparatuses in direct communications with the first apparatus, where the schedule includes an awake period reserved for directional communications between the first apparatus and the second apparatus (e.g., awake periods reserved for uni-directional communications from the first apparatus to the second apparatus or from the second apparatus to the first apparatus, or an awake period reserved for bi-directional communications between the first apparatus and the second apparatus, or a combination thereof), managing the awake period reserved for the directional communications based on traffic information associated with the first apparatus or the second apparatus, and communicating with the second apparatus in accordance with the managing.

A non-transitory computer-readable medium storing code for wireless communications at a first UE of a group of UEs is described. The code may include instructions executable by a processor to identify a schedule associated with the first UE and a second UE of the group of UEs in direct communications with the first UE, where the schedule includes an awake period reserved for directional communications between the first UE and the second UE (e.g., awake periods reserved for uni-directional communications from the first UE to the second UE or from the second UE to the first UE, or an awake period reserved for bi-directional communications between the first UE and the second UE, or a combination thereof), manage the awake period reserved for the directional communications based on traffic information associated with the first UE or the second UE, and communicate with the second UE in accordance with the managing.

Some examples of the method, apparatuses, and non-transitory computer-readable medium described herein may further include operations, features, means, or instructions for receiving a request message from the second UE, the request message including the traffic information associated with the second UE, transmitting an response message to the second UE based on the request message and the traffic information associated with the first UE, and where managing the awake period reserved for the directional communications may be based on the request message and the traffic information associated with the first UE.

In some examples of the method, apparatuses, and non-transitory computer-readable medium described herein, one or more of the request message or the response message may be a PC5 radio resource control message or a medium access control-control element message.

In some examples of the method, apparatuses, and non-transitory computer-readable medium described herein, the request message includes an indication of a number of cycles associated with modifying the awake period reserved for the directional communications.

In some examples of the method, apparatuses, and non-transitory computer-readable medium described herein, the request message carries a cause indication indicating that a traffic load associated with the second UE satisfies a threshold based on the traffic information associated with the second UE, and where managing the awake period reserved for the directional communications may be based on an inactivity associated with the directional communications between the second UE and the first UE (e.g., an inactivity associated with uni-directional communications from the second UE to the first UE).

Some examples of the method, apparatuses, and non-transitory computer-readable medium described herein may further include operations, features, means, or instructions for identifying, in the request message, an indication to remove the awake period reserved for the directional communications (e.g., awake periods reserved for uni-directional communications), releasing one or more resources associated with the awake period reserved for the directional communications (e.g., awake periods reserved for the uni-directional communications) based on the request message and the traffic information, including, in the response message, an acknowledgement associated with releasing the one or more resources associated with the awake period reserved for the directional communications (e.g., awake periods reserved for the uni-directional communications), and where communicating with the second UE may be based on one or more of releasing the one or more resources associated with the awake periods reserved for the uni-directional communication and the response message.

Some examples of the method, apparatuses, and non-transitory computer-readable medium described herein may further include operations, features, means, or instructions for identifying, in the request message, an indication to modify the awake period reserved for the directional communications (e.g., awake periods reserved for uni-directional communications), including, in the response message, an acknowledgement associated with adjusting the duration of the awake period reserved for the directional communications (e.g., one or more of the awake periods reserved for the uni-directional communications), and where communicating with the second UE may be based on the response message.

Some examples of the method, apparatuses, and non-transitory computer-readable medium described herein may further include operations, features, means, or instructions for identifying one or more bit-values assigned to a field in the request message, where the one or more bit-values correspond to the duration of the awake period reserved for the directional communications (e.g., durations of the awake periods reserved for the uni-directional communications).

Some examples of the method, apparatuses, and non-transitory computer-readable medium described herein may further include operations, features, means, or instructions for identifying, in the request message, an indication to remove the awake period reserved for the directional communications (e.g., awake period reserved for the bi-directional communications), including, in the response message, an acknowledgement associated with releasing one or more resources associated with the awake period reserved for the directional communications (e.g., awake period for the bi-directional communications), and where communicating with the second UE may be based on the response message.

Some examples of the method, apparatuses, and non-transitory computer-readable medium described herein may further include operations, features, means, or instructions for identifying a bit-value assigned to a field in the request message, where the bit-value corresponds to the duration of the awake period reserved for the directional communications (e.g., awake period reserved for the bi-directional communications).

Some examples of the method, apparatuses, and non-transitory computer-readable medium described herein may further include operations, features, means, or instructions for identifying, in the request message, an indication to allocate the awake period reserved for the directional communications (e.g., awake period reserved for the bi-directional communications) exclusively to the first UE, including, in the response message, an acknowledgement associated with allocating the awake period reserved for the directional communications (e.g., awake period reserved for the bi-directional communications) exclusively to the first UE, and where communicating with the second UE may be based on the response message.

Some examples of the method, apparatuses, and non-transitory computer-readable medium described herein may further include operations, features, means, or instructions for communicating with a third UE in the group of UEs in accordance with managing the awake period reserved for the directional communications.

In some examples of the method, apparatuses, and non-transitory computer-readable medium described herein, the awake period reserved for directional communications may include awake periods reserved for uni-directional communications from the first UE to the second UE or an awake period reserved for bi-directional communications between the first UE and the second UE, where the awake period reserved for the bi-directional communications may be shared between the first UE and the second UE, and where the awake periods reserved for the uni-directional communications may be unshared between the first UE and the second UE.

Some examples of the method, apparatuses, and non-transitory computer-readable medium described herein may further include operations, features, means, or instructions for transmitting, to the second UE, an indication associated with allocating the awake period reserved for the directional communications (e.g., awake period reserved for the bi-directional communications) exclusively to the second UE, and where communicating with the second UE may be based on the indication.

BRIEF DESCRIPTION OF THE DRAWINGS

FIGS. 10 through 13 show flowcharts illustrating methods that support methods of scheduling with inactivity in sidelink unicast in accordance with aspects of the present disclosure.

DETAILED DESCRIPTION

Figure 1:
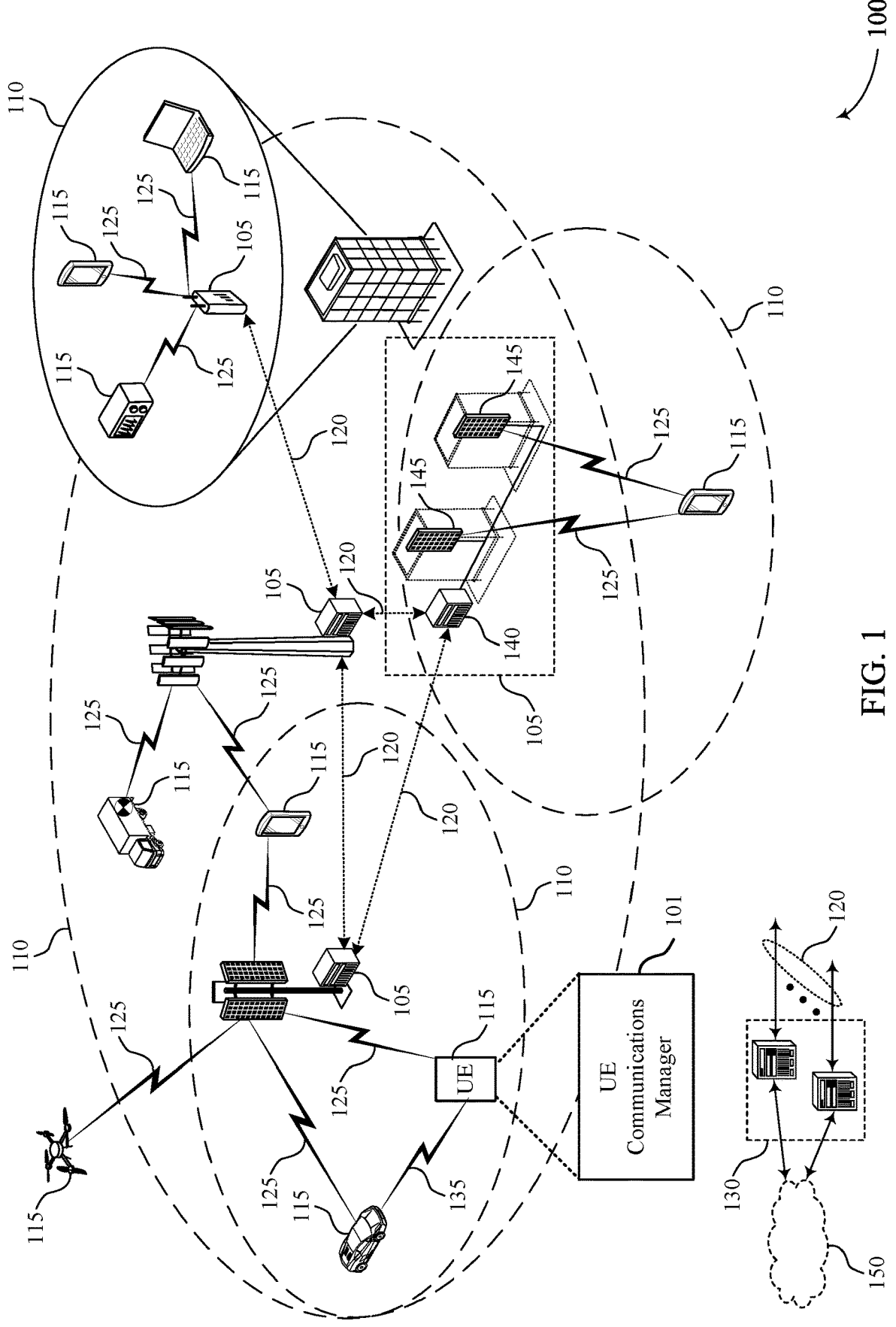
FIG. 1 illustrates an example of a system for wireless communications that supports methods of scheduling with inactivity in sidelink unicast in accordance with aspects of the present disclosure.

A wireless communications system may support both access links and sidelinks for communications between wireless devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs.

For example, a UE communicating with one or more additional UEs in the group of UEs (e.g., in a D2D system, among other examples) may transmit information to or receive information from the other UEs. To solve scheduling issues which may be associated with communicating with multiple concurrent peers (e.g., peer UEs in the group of UEs), the UE may reserve resources (e.g., time slots or time periods) for transmitting or receiving information. In some examples, reservations may be semi-persistent, and the UE may reserve resources based on predictions of future communication demands by the UE or another UE of the group of UEs in communication with the UE. However, demand predictions may not always be accurate, and the UE may unintentionally reserve more resources in a unicast link (e.g., a distributed NR sidelink reservation) than needed. In such examples, a UE which is aware of its own inactivity with respect to an established unicast link (e.g., a schedule already negotiated between the UE and another UE among the group of UEs) may inform the other UE (e.g., a peer UE) associated with the link to adjust the reservation.

As described herein, power saving techniques for sidelink communications may be used to enable reduced power consumption and extended battery life while ensuring reliable and efficient communications in the group of UEs. The power saving techniques may be implemented in part by one or more UEs of the group of UEs. In some examples, a UE may utilize a signaling mechanism to manage unidirectional schedules or bi-directional schedules associated with communications between the UE and another UE. For example, the UE may modify or update directional schedules (e.g., unidirectional schedules or bi-directional schedules) associated with communications between the UE and another UE. In some examples, managing the schedules may include releasing another UE from prior communication obligations (e.g., terminating a unicast link associated with uni-directional communications from the UE to the other UE, or from the other UE to the UE, and releasing associated resources).

Aspects of the examples described herein may pose several advantages to communications associated with various communications technologies. For example, at the sub-6 GHz range, if a UE is aware of its own inactivity (e.g., no additional transmissions from the UE) with respect to an established unicast link (e.g., a schedule already negotiated between the UE and a peer UE) and informs the peer UE of the inactivity, the peer UE may use resources previously committed to the link to schedule transmissions between other peer UEs. In millimeter wave (mmW) communications, for example, a peer UE may similarly reuse previously committed resources as described, but may also benefit from being able to receive a transmission in another beam direction.

In some examples, a UE of a group of UEs may identify a schedule associated with the UE and another UE (e.g., a peer UE) of the group of UEs. The schedule may include an awake period for directional communications between the UE and the peer UE (e.g., an awake period reserved for uni-directional communications from the UE to the peer UE, or an awake period reserved for bi-directional communications between the UE and the peer UE, or a combination thereof). The UE may transmit a request message to the peer UE based the traffic information associated with the UE. In an example, the request message may include an indication of a number of cycles associated with modifying one or more of the awake periods. In some examples, the request message may include a cause indication (e.g., inactivity, traffic load exceeding a traffic expectation) associated with the request message. The UE may receive an response message from the peer UE and may manage the awake period (e.g., one or more of the awake periods for uni-directional communications or bi-directional communications) based on the response message. In some cases, the response message may include an acknowledgement (e.g., accept) or non-acknowledgement (e.g., reject) and an associated reason (e.g., traffic information associated with the peer UE, such as scheduled communications from the peer UE to the UE).

According to examples of aspects described herein, the UE may manage the awake period (e.g., one or more of the awake periods for uni-directional communications or bi-directional communications) based on traffic information (e.g., traffic load, inactivity) associated with the UE and the response message from the peer UE. In some examples, the UE may terminate a unicast link associated with uni-directional communications from the UE to the peer UE and remove an awake period for the uni-directional communications (e.g., release resources associated with the awake period). In another example, the UE may adjust a duration of the awake period for the uni-directional communications. In other example aspects, the UE may adjust a duration of an awake period reserved for directional communications (e.g., bi-directional communications) between the UE and the peer UE, or remove the awake period (e.g., release resources associated with the awake period). In another aspect, the UE may allocate the awake period exclusively to the UE or the peer UE (e.g., exclusively allocate the awake period reserved for bi-directional communications between the UE and the peer UE to an awake period reserved for uni-directional communications associated with the UE or the peer UE). Through one or any combination of the described techniques, UEs may implement various schemes for power savings enhancements, thereby improving battery life and reducing unnecessary power consumption at the UE while providing efficient and reliable communications on a sidelink.

Aspects of the disclosure are initially described in the context of a wireless communications system. Aspects of the disclosure are further illustrated by and described with reference to apparatus diagrams, system diagrams, and flowcharts that relate to methods of scheduling with inactivity in sidelink unicast.

FIG. 1 illustrates an example of a wireless communications system 100 that supports methods of scheduling with inactivity in sidelink unicast in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like. The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may monitor a communication link 125 (e.g., a wireless link) continuously for an indication that the UE 115 may receive data or for a data transmission. In other cases (e.g., to conserve power and extend battery life) a UE 115 may be configured with a discontinuous reception (DRX) cycle. A DRX cycle consists of an "On Duration" (i.e., an awake period) when the UE 115 may monitor for communications (e.g., from a base station 105 and/or from another UE 115) and a "DRX period" when the UE 115 may power down radio components. In some cases, the DRX cycle and/or the continuous reception may be controlled by an internal timer. For example, while monitoring for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may refrain from further monitoring for the rest of the DRX cycle (e.g., the UE 115 may power down radio components). Additionally or alternatively, the UE 115 may move into a short DRX cycle and may start a "DRX Short Cycle Timer". When the DRX Short Cycle Timer expires, the UE 115 may enter a long DRX cycle (e.g., power down radio components for a relatively longer time period). However, the use of such timers may be inefficient in some wireless communications systems. For example, the inactivity timers may increase the likelihood that a UE in a group of UEs (e.g., communicating over a sidelink communication link 135) may fail to receive a sidelink communication.

Accordingly, wireless communications system 100 may support various techniques for power savings when communicating in a group of UEs. As an example, a UE 115 may be a group leader of the group of UEs (e.g., configured by an upper layer to be the group leader, a UE 115 that performs group leader functions for the group of UEs, or a combination thereof). The UE 115 may receive traffic information of other UEs 115 (e.g., from an upper layer, from the other UEs 115, or both). The UE 115 may consolidate the received traffic information and determine a DRX configuration for the group of UEs. For example, the UE 115 may determine a DRX schedule indicating one or more DRX cycles for the group of UEs 115. In some cases, the UE 115 may broadcast the DRX configuration to the group of UEs 115, provide an acknowledgement message and/or an adjustment message to another UE 115 in response to a request included in the traffic information of the other UE 115, among other operations. Such a group leader UE 115 may enable the group of UEs 115 to reduce power consumption (e.g., compared to continuous monitoring) while maintaining reliable communications.

In some examples, the other UEs 115 in the group of UEs 115 may be referred to as "member" UEs 115. A member UE 115 may communicate with the group of UEs 115 using sidelink communications. The member UE 115 may identify the group leader UE 115 (e.g., based on a notification from an upper layer, determining the group leader UE 115 based on information from the AS layer, or both). The member UE 115 may provide traffic information (e.g., a group member ID, a transmission schedule of the member UE 115, and the like) to the group leader UE 115 and/or an upper layer. In some examples, the member UE 115 may continuously monitor for sidelink communications from the group of UEs 115. The member UE 115 may receive a DRX configuration from the group leader UE 115 (e.g., based on an announcement or groupcast transmission from the group leader UE 115) and implement the DRX configuration in order to save power. For example, the DRX configuration may include a DRX schedule indicating that each member UE 115 of the group of UEs 115 may communicate during an awake period and power off radio components during a DRX period of a DRX cycle. The DRX configuration may be for a single DRX cycle or multiple DRX cycles.

One or more of the UEs 115 may include a UE communications manager 101, which may identify a schedule associated with the UE 115 and another UE 115 of a group of UEs 115 in direct communications with the UE 115. The UE communications manager 101 may be an example of aspects of the UE communications manager 615 described herein. The schedule may include an awake period reserved for directional communications between the UE 115 and the other UE 115 (e.g., an awake period reserved for uni-directional communications from the UE 115 to the other UE 115, or an awake period reserved for bi-directional communications between the UE 115 and the other UE 115, or a combination thereof). The UE communications manager 101 may manage the awake period reserved for the directional communications (e.g., one or more of the awake period reserved for the uni-directional communications or the awake period reserved for the bi-directional communications based on traffic information associated with the UE 115) and communicate with the other UE 115 in accordance with the managing.

From an example perspective of the other UE 115, the UE communications manager 101 may also identify a schedule associated with the other UE 115 and the UE 115. The schedule may include an awake period reserved for directional communications between the other UE 115 and the UE 115 (e.g., an awake period reserved for uni-directional communications from the other UE 115 to the UE 115 or from the UE 115 to the other UE 115, or an awake period reserved for bi-directional communications between the other UE 115 and the UE 115, or a combination thereof). The UE communications manager 101 may manage the awake period reserved for the directional communications (e.g., one or more of the awake periods reserved for the uni-directional communications or the awake period reserved for the bi-directional communications) based on traffic information associated with the other UE 115 or the UE 115, and communicate with the UE 115 in accordance with the managing.

Figure 2:
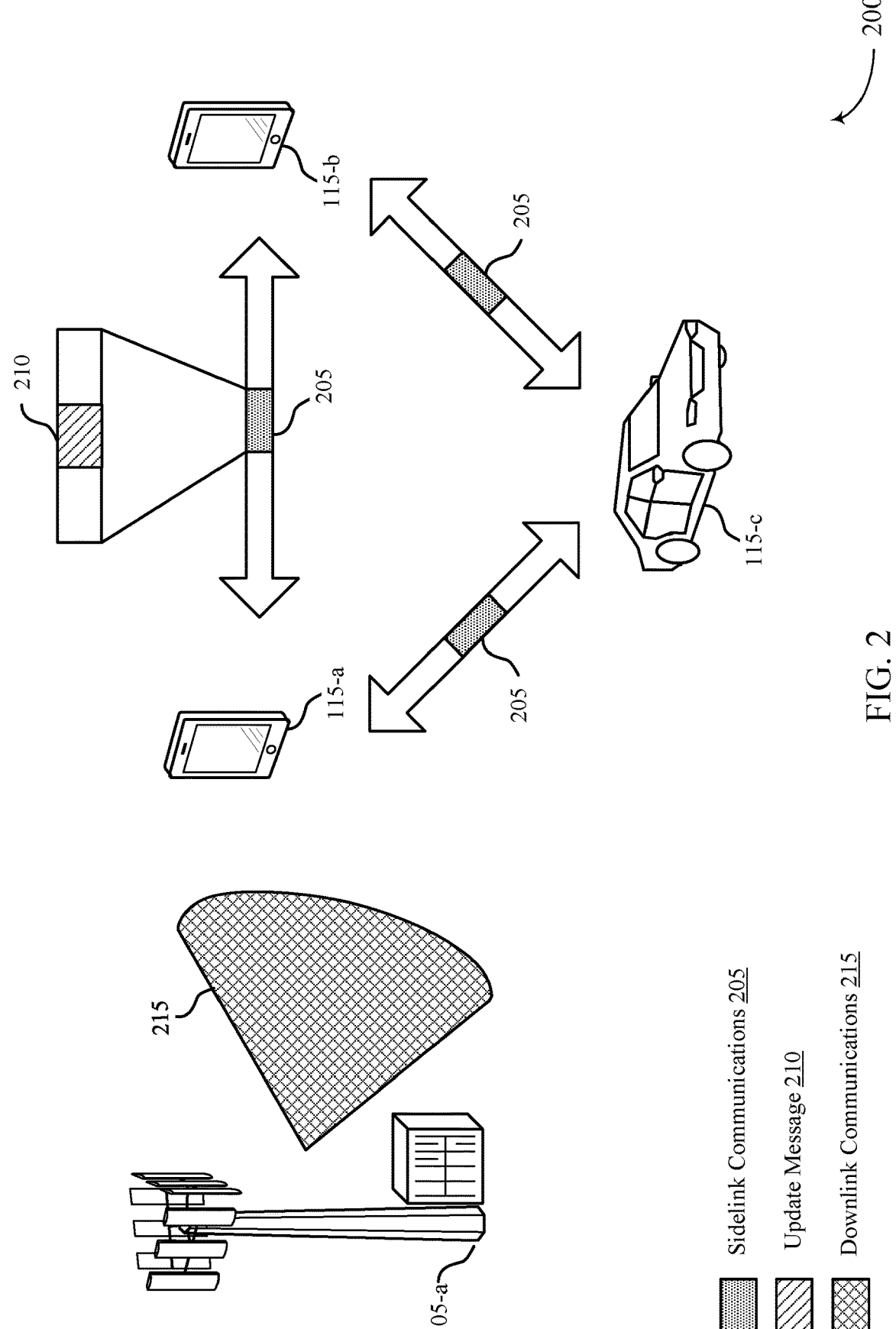
FIG. 2 illustrates an example of a wireless system that supports device-to-device (D2D) scheduling for wireless communications systems in accordance with aspects of the present disclosure.

FIG. 2 illustrates an example of a wireless communications system 200 that supports D2D scheduling in accordance with aspects of the present disclosure. In some examples, wireless communications system 200 may implement aspects of wireless communication system 100 and may include a group of UEs 115 (e.g., a UE 115-a, a UE 115-b, and a UE 115-c) and a base station 105-a, which may be examples of UEs 115 and a base station 105, respectively, described with reference to FIG. 1. In some cases, the group of UEs 115 may communicate with each other (e.g., within a V2X system, a D2D system, and the like) and may employ scheduling operations (e.g., associated with D2D communications) to save power and ensure reliable communications.

According to some aspects, the group of UEs 115 may communicate with each other (or with another group of UEs 115) over sidelink communications 205 (e.g., using a P2P or D2D protocol). For example, the UE 115-a may monitor resource pools for sidelink communications 205 and/or indications of the sidelink communications 205 (e.g., resource reservations, control channel transmissions, among other examples) from the UEs 115-b and 115-c. Additionally or alternatively, the UE 115-a may have data to transmit to the UE 115-b and/or UE 115-c and may use the sidelink communications 205 to transmit the data.

In some examples, the group of UEs 115 may utilize sidelinks (e.g., sidelink communications 205) in addition to access links for communication with the base station 105-a. For example, one or more of the UEs 115 may be in a coverage area (e.g., coverage area 110) of the base station 105-a. In such examples, a UE 115 may communicate with the base station 105-a via a Uu interface (e.g., the base station 105-a may transmit downlink communications 215 to one or more of the UEs 115). In some other examples, the group of UEs 115 may not be inside the coverage area and/or may not communicate with the base station 105-a using an access link.

In some cases, communications between UEs 115 (or between the UEs 115 and another group of UEs 115) over sidelink communications 205 may be decentralized (e.g., P2P, D2D, direct, as opposed to via the base station 105-a), and a UE 115 may implement reservation schemes to schedule signal transmissions between the UE 115 and other UEs 115 in the group of UEs 115, using predictions of future communication demands by the UE 115. However, demand predictions may not always be accurate, and the UE 115 may unintentionally reserve more resources in a unicast link than needed. Such unintentional or unnecessary reservations of resources may result in wasted communications resources, delayed transmissions due to a decreased availability of resources, and unnecessary power usage due to activity of the UE 115 during awake periods associated with the reservations.

Techniques for direct communications (e.g., D2D communications) among UEs 115 are proposed that may ensure reliable communications, efficient use of resources, and power savings. In an example, the UE 115-a may identify a schedule associated with the UE 115-a and UE 115-b of a group of UEs 115 in direct communications with the UE 115-a. The schedule may include an awake period reserved for directional communications between the UE 115-a and the UE 115-b (e.g., an awake period reserved for uni-directional communications from the UE 115-a to the UE 115-b, or an awake period reserved for bi-directional communications between the UE 115-*a* and the UE 115-*b*, or a combination thereof). The UE 115-*a* may manage the awake period reserved for the directional communications (e.g., one or more of the awake period reserved for the uni-directional communications or the awake period reserved for the bi-directional communications) based on traffic information associated with the UE 115-*a*, and communicate with the UE 115-*b* in accordance with the managing.

According to examples of aspects described herein, UEs 115 may utilize update messages 210 for managing the awake period reserved for the directional communications (e.g., the awake periods reserved for uni-directional communications or bi-directional communications). The update messages 210 may include a request message or an response message. For example, the UE 115-*a* may transmit a request message to the UE 115-*b* based on the traffic information associated with the UE 115-*a* and may receive an response message from the UE 115-*b* based on the request message. In some examples, the UE 115-*a* may manage the awake period reserved for the directional communications (e.g., one or more of the awake periods reserved for uni-directional communications or bi-directional communications) based on the response message.

From an example perspective of the UE 115-*b*, the UE 115-*b* may also identify a schedule associated with the UE 115-*b* and the UE 115-*a*. The schedule may include an awake period reserved for directional communications between the UE 115-*b* and the UE 115-*a* (e.g., an awake period reserved for uni-directional communications from the UE 115-*b* to the UE 115-*a* or from the UE 115-*a* to the UE 115-*b*, or an awake period reserved for bi-directional communications between the UE 115-*b* and the UE 115-*a*, or a combination thereof). The UE 115-*b* may manage based on traffic information associated with the UE 115-*b* or the UE 115-*a*, and communicate with the UE 115-*a* in accordance with the managing.

According to examples of aspects described herein, the UE 115-*b* may receive an update message 210 (e.g., a request message) from the UE 115-*a* and may transmit an update message 210 (e.g., an response message) to the UE 115-*a* based on the request message and the traffic information associated with the UE 115-*b*. In some examples, the UE 115-*b* may manage the awake period reserved for the directional communications (e.g., one or more of the awake periods reserved for the uni-directional communications or the awake period reserved for the bi-directional communications) based on the request message and the traffic information associated with the UE 115-*b*.

Figure 3:
FIG. 3 illustrates an example of a wireless system that supports methods of scheduling with inactivity in sidelink unicast in accordance with aspects of the present disclosure.

FIG. 3 illustrates an example of a wireless system 300 that supports methods of scheduling with inactivity in sidelink unicast in accordance with aspects of the present disclosure. In some examples, the wireless system 300 may implement aspects of the systems 100 and 200 as described herein with reference to FIGS. 1 and 2. The wireless system 300 may include UEs 115 (e.g., UEs 115-*d* through 115-*i*), which may be examples of aspects of UEs 115 and UE 115-*a* through UE 115-*c* as described herein with reference to FIGS. 1 and 2.

FIG. 3 illustrates an example in which a UE 115 may be able to communicate directly with other UEs 115. In the example, the UE 115-*d* may communicate directly (e.g., using P2P or D2D protocol) with the UEs 115-*e* through UE 115-*i*. For example, the UE 115-*d* may be communicating directly with the UE 115-*e* (e.g., as indicated by solid lines), and may communicate directly with any of the UEs 115-*f* through 115-*i* (e.g., as indicated by dotted lines). Sidelink communications 305 and update message 310 may be examples of aspects of sidelink communications 205 and update message 210 as described herein with reference to FIG. 2. Communications link 315 may include sidelink communications 305. In some examples, communications link 315 may include directional communications between the UE and another UE 115. For example, communications link 315 may include uni-directional communications from the UE 115 to the other UE 115 or bi-directional communications between the UE 115 and the other UE 115 (e.g., uni-directional communications from the UE 115-*d* to the UE 115-*e* or bi-directional communications between the UE 115-*d* and the UE 115-*e*).

In some wireless systems, direct communications (e.g., P2P, D2D) between the UEs 115 may be decentralized (e.g., lack of centralized control of MAC scheduling, for example, by a base station 105 or 105-*a*). In direct communications, for example, conflicts associated with half-duplex communications may be resolved in scheduling. For example, half-duplex communications may utilize one-way communication via transmission or reception, but not transmission and reception simultaneously, and a UE 115 (e.g., UE 115-*d*) may be unable to transmit to another UE 115 (e.g., any of UE 115-*e* through UE 115-*i*) if the other UE 115 is not in a receive (RX) state.

In the mmW spectrum, communication conflicts may increase. For example, a UE 115 (e.g., UE 115-*d*) may be unable to transmit to another UE 115 (e.g., any of UE 115-*e* through UE 115-*i*) if the other UE 115 is not in an RX state in a particular beam direction (e.g., an RX beam direction associated with a TX beam direction of the UE 115). For example, for communications in the mmW spectrum, the complexity associated with scheduling multiple direct communications (e.g., D2D links) in different directions may be much higher compared to other spectrums. For example, for communications in the mmW spectrum, if the UE 115-*d* is in communication with the UE 115-*e* and wishes to communicate with another UE 115 (e.g., the UE 115-*f*), the UE 115-*d* may be unable to simply revert an existing schedule between the UE 115-*d* and the UE 115-*e* and start transmitting to the UE 115-*f*, due to the beam management. In mmW communications, the UE 115-*d* may be unable to modify the schedule freely based on availability of peer UEs 115 (e.g., the UE 115-*f*).

For the mmW spectrum, for example, contention-based access may not be sufficient (e.g., for successful communication transmissions), as sensing in contention-based access may be limited with respect to directions. Additionally, the cost to send or receive a "random access" control signal (e.g., random access signaling) may be high due to beam-sweeping. Accordingly, communication resources may be better satisfied (e.g., utilized) on a reservation basis, for example, such that UE scheduling (e.g., scheduling by the UEs 115) may be more deterministic.

For example, similar to DRX cycles and DRX handling, the unavailability of a beam in a beam direction (e.g., "beam-direction unavailable") may create a similar effect as with DRX with respect to UE scheduling. In some examples, peer UEs 115 on a unicast link (e.g., UE 115-*d* and UE 115-*e* communicating via sidelink communications 305) may negotiate respective "onDuration" periods (e.g., awake periods) for communication. In some examples, outside of "onDuration" periods associated with a unicast link, the UE 115-*d* and UE 115-*e* may not be obliged to be available for the unicast link. For example, outside of the "onDuration" periods associated with the unicast link between the UE 115-*d* and UE 115-*e*, the UE 115-*d* and UE 115-*e* may be available for communications (e.g., unicast links) with other UEs 115 of the UE group (e.g., UEs 115-*f* through UEs 115-*i*) or another UE group.

According to examples of aspects herein, a UE 115 may determine the length of an "onDuration" (e.g., awake period) based on an amount of resources (e.g., slots, cycles) needed by the UE 115 for traffic. In some examples, the UE 115 may determine the length of an "onDuration" based on traffic demands associated with communications between other devices (e.g., other UEs 115 in a UE group or other UE group). For example, the UE 115-*d* may determine the length of an "onDuration" based on an amount of resources needed by the UE 115-*d* for traffic between the UE 115-*d* and any of UE 115-*e* through UE 115-*i*. In some examples, the "onDuration" may include a duty cycle.

In some examples, the UE 115 may reserve an "onDuration" (e.g., awake period, resources associated with an awake period) for communications with another UE 115 based on a prediction of traffic demand associated with the UE 115 (e.g., traffic between the UE 115 and other UEs 115 of the UE group or another UE group). However, inaccuracies in predicted traffic demand may occur. For example, the UE 115 may overestimate or underestimate traffic demand (e.g., overestimate or underestimate the amount of resources the UE 115 may use for communication).

According to examples of aspects herein, the UE 115 may manage (e.g., modify, maintain, or remove) reserved "onDurations" (e.g., awake periods) associated with communications (e.g., directional communications) between the UE 115 and other UEs 115 based on traffic demand or traffic demand predictions. In an example, the UE 115 may modify, maintain, or remove reserved "onDurations" associated with communications between the UE 115 and other UEs 115 based on traffic demand or traffic demand predictions. For example, the UE 115-*d* may modify, maintain, or remove reserved "onDurations" associated with communications (e.g., directional communications) between the UE 115-*d* and any of UE 115-*e* through UE 115-*i* based on traffic demand or traffic demand predictions.

According to examples of aspects described herein, the UEs 115 may utilize update messages 310 for managing the "onDurations". The update messages 310 may include a request message or an response message. For example, the UE 115-*d* may transmit a request message to the UE 115-*e* based on the traffic information associated with the UE 115-*d* and may receive an response message from the UE 115-*e* based on the request message.

In an example, the UE 115 may provide or include a reason (e.g., cause indication) in the request message. For example, the UE 115-*d* may indicate in the request message that there is no traffic (e.g., inactivity) associated with a communications link 315 (e.g., sidelink communications 305) between the UE 115-*d* and the UE 115-*e*. In some examples, the UE 115-*d* may indicate, in the request message, an inactivity associated with directional communications between the UE 115-*d* and the UE 115-*e* based on traffic information associated with the UE 115-*d*. For example, the UE 115-*d* may indicate, in the request message, an inactivity associated with uni-directional communications from the UE 115-*d* to the UE 115-*e* based on the traffic information associated with the UE 115-*d*. In some examples, the UE 115-*d* may indicate, in the request message, an inactivity associated with bi-directional communications between the UE 115-*d* and the UE 115-*e* based on the traffic information associated with the UE 115-*d*.

In some examples, the UE 115-*d* may indicate in the request message that the UE 115-*d* is to serve other links (e.g., other communications links 315, sidelink communications 305) with more time than allocated to a scheduled "onDuration" and can no longer guarantee the "onDuration" on the directional link (e.g., communications link 315, sidelink communication 305, between the UE 115-*d* and the UE 115-*e*). In some examples, the UE 115-*d* may indicate in the request message that the UE 115-*d* is handling more traffic than expected or predicted by the UE 115-*d*. For example, the UE 115-*d* may determine that a traffic load associated with the UE 115-*d* satisfies a threshold (e.g., exceeds an expected traffic load).

Figure 4:
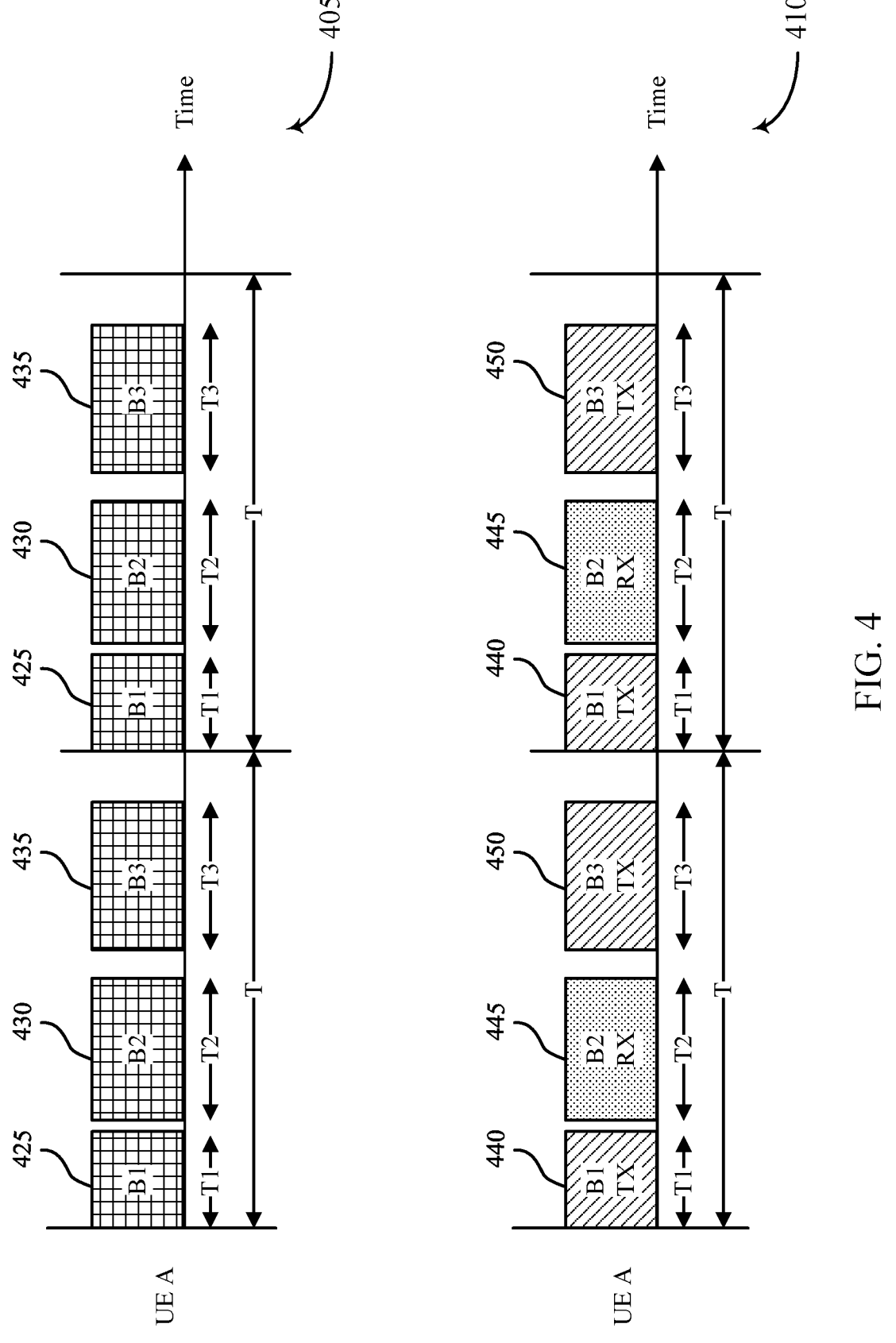
FIG. 4 illustrates example of timing diagrams that support methods of scheduling with inactivity in sidelink unicast in accordance with aspects of the present disclosure.

FIG. 4 illustrates an example of timing diagrams 405 and 410 that support methods of scheduling with inactivity in sidelink unicast in accordance with aspects of the present disclosure. In some examples, the timing diagrams 405 and 410 may implement aspects of the systems 100, 200, and 300 as described herein with reference to FIGS. 1, 2 and 3. Timing diagrams 405 and 410 illustrate examples of aspects of scheduled "onDuration" periods (e.g., awake periods) associated with bi-directional communications and uni-directional communications between a UE A (e.g., UE 115-*d*) and additional UEs, UE B1, UE B2, and UE B3 (e.g., UEs 115-*e* through 115-*g*).

Timing diagram 405 illustrates an example of a bi-directional communications schedule where a UE A may share the same "onDuration" period for traffic in either direction with UE B1, UE B2, and UE B3 (e.g., from the UE A to the UE B1, or from the UE B1 to the UE A). For example, "onDuration" period 425 (e.g., B1) may correspond to an awake period associated with bi-directional communications between UE A and the UE B1, "onDuration" period 430 (e.g., B2) may correspond to an awake period associated with bi-directional communications between the UE A and the UE B2, and "onDuration" period 435 (e.g., B3) may correspond to an awake period associated with bi-directional communications between the UE A and the UE B3.

Timing diagram 410 illustrates an example of a uni-directional communications schedule where, for a peer UE transmitting to another peer UE, separate "onDuration" periods may be reserved for traffic in different directions. For example, for a UE A and a UE B1 (e.g., or any of UE B1, UE B2, or UE B3), the UE A may have a separate "onDuration" period for traffic in a direction from the UE A to the UE B1, and the UE B1 may have a separate "onDuration" period for traffic in a direction from the UE B1 to the UE A. For example, "onDuration" period 440 (e.g., B1 TX) may correspond to an awake period reserved for uni-directional communications from the UE A to the UE B1 (e.g., and not from the UE B1 to the UE A), "onDuration" period 445 (e.g., B2 RX) may correspond to an awake period reserved for uni-directional communications from the UE B2 to the UE A (e.g., and not from the UE A to the UE B2), and "onDuration" period 450 (e.g., B3 TX) may correspond to an awake period reserved for uni-directional communications from the UE A to the UE B3 (e.g., and not from the UE B3 to the UE A).

According to examples of aspects described herein, the wireless communications systems 100, 200, and 300 (e.g., the UEs 115 in direct communications with one another) as described herein may use bi-directional scheduling, uni-directional scheduling, or a combination thereof in one or more mixed manners. In some examples, the wireless communications systems 100, 200, and 300 may incorporate directional scheduling (e.g., bi-directional scheduling and uni-directional scheduling) in sub-6 GHz and mmW communications. Examples of aspects of using signaling messages to adjust communications schedules based on inactivity are described herein with respect to FIG. 4, UE A (e.g., which may correspond to UE 115-*d* of FIG. 3), and additional UEs, UE B1, UE B2, and UE B3 (e.g., which may correspond to UEs 115-*e* through 115-*g* of FIG. 3). According to examples of aspects herein, the UE A may perform schedule updates for directional communications (e.g., unidirectional communications and bi-directional communications).

As described herein with respect to the example unidirectional schedule in the timing diagram 405, "ON" slots (e.g., "onDuration" periods, awake periods) may be reserved for both directions from a UE 115 to another UE 115 and from the other UE 115 to the UE 115 (e.g., the "onDuration" period 425 (e.g., B1) may correspond to an awake period reserved for bi-directional communications to the UE A from the UE B1 and from the UE B1 to the UE A. In an example, the UE A (e.g., UE 115-*d*) may send a request message to UE B1 (e.g., UE 115-*e*) to adjust the bi-directional schedule for the "onDuration" period associated with UE A and UE B1 (e.g., the "onDuration" period 425). For example, the UE A may have no more traffic (e.g., no more traffic associated with a communications link between the UE A and the UE B1, for example, inactivity associated with transmitting from the UE A to the UE B1), and the UE A may request in the request message to delete the "onDuration" occurrence (e.g., the "onDuration" period 425).

The UE B1 may send an response message to the UE A, accepting or rejecting the request. In an example, the UE B1 may still have traffic associated with the communications link between the UE A and the UE B1, for example, associated with transmitting from the UE B1 to the UE A. Based on the response message, the UE A (e.g., and the UE B1) may maintain the "onDuration" period 425. For example, the UE A and the UE B1 may modify (e.g., morph) the "onDuration" period 425 from an "onDuration" period for bi-directional communications (e.g., for communications to the UE A from the UE B1 and from the UE B1 to the UE A) to an "onDuration" period for uni-directional communications (e.g., from the UE B1 to the UE A). In some examples, as the traffic demand associated with the modified "onDuration" may be reduced (e.g., to half, based on only uni-directional communications from the UE B1 to the UE A), the UE A (e.g., and the UE B1) may adjust the duration (e.g., slot size) of the "onDuration" period.

In some examples, if UE B1 has no more traffic (e.g., no more traffic associated with a the modified "onDuration" period for uni-directional communications from the UE B1 to the UE A), the UE B1 may send a request message to the UE A to delete the "onDuration" period. Aspects of the request message may be as described herein with respect to a "unidirectional' case of freeing the slot (e.g., deleting an "onDuration" period associated with uni-directional communications). Further, as described herein with respect to the example uni-directional schedule in the timing diagram 410, "ON" slots (e.g., "onDuration" periods, awake periods) may be reserved for a direction from a UE 115 to another UE 115, and not from the other UE 115 to the UE 115 (e.g., the "onDuration" period 440 (e.g., B1 TX) may correspond to an awake period reserved for uni-directional communications to the UE A from the UE B1, and not from the UE B1 to the UE A.

In an example, the UE A (e.g., UE 115-*d*) may send a request message to UE B1 (e.g., UE 115-*e*) to adjust the uni-directional schedule for the "onDuration" period of "TX B" (e.g., the "onDuration" period 440). For example, the UE A may have no more traffic (e.g., no more traffic associated with a communications link between the UE A and the UE B1), and the UE A may request in the request message to delete the "onDuration" occurrence (e.g., the "onDuration" period 440).

According to examples of aspects herein, the UE A (e.g., UE 115-*d*) may request deletion of the "onDuration" occurrence (e.g., the "onDuration" period 440) in association with a "fast change" or a "slow change". In an example, the UE A may signal an inactivity in reference to an original negotiated schedule between the UE A and the UE B1 (e.g., the UE 115-*e*). The UE A may signal a duration of the inactivity with respect to the original negotiated schedule. In an example of a "fast change", the UE A may include, in the request message, a request to delete or modify the "onDuration" period 440 (e.g., B1 Tx) for a single cycle T or multiple cycles T beginning from or after a current cycle T, after which the UE A and the UE B1 may resume communicating according to the original negotiated schedule. In another example of a "fast change", the UE A may include, in the request message, a request to delete or modify the "onDuration" period 440 for all cycles T (e.g., release of a unicast link between the UE A and the UE B1) beginning from or after a current cycle T. In an example of a "slow change", the UE A may migrate or renegotiate deletions or modifications to the "onDuration" period 440 over multiple cycles T (e.g., over separate signals or request messages transmitted from the UE A to the UE B1). According to examples of aspects described herein, the UE A may no longer have traffic or communications associated with communication from the UE A to the UE B1 and from the UE B1 to the UE A. In such examples, the UE A may include, in the request message, a request to release a unicast link between the UE A and the UE B1 which may free all "onDuration" slots or periods for "TX A/B" (e.g., "onDuration" period 440) and "RX A/B" (not shown).

Figure 5:
FIG. 5 illustrates an example of a process flow that supports methods of scheduling with inactivity in sidelink unicast in accordance with aspects of the present disclosure.

FIG. 5 illustrates an example of a process flow 500 that supports methods of scheduling with inactivity in sidelink unicast in accordance with aspects of the present disclosure. The process flow 500 may illustrate an example scheduling scheme (e.g., D2D scheduling) between UEs 115 of a wireless system. For example, the UE 115-*j* and the UE 115-*k* may perform a scheduling procedure for "onDuration" periods (e.g., awake periods) associated with uni-directional or bi-directional communications.

The UE 115-*j* and the UE 115-*k* may be examples of the corresponding wireless devices described with reference to FIGS. 1 through 4. For example, the UE 115-*j* and the UE 115-*k* may be in direct communications (e.g., D2D communications) with one another. In some cases, either of the UE 115-*j* and the UE 115-*k* may initiate the example scheduling procedure (e.g., send a request message or an response message). Alternative examples of the following may be implemented, where some steps are performed in a different order than described or are not performed at all. In some cases, steps may include additional features not mentioned below, or further steps may be added.

At 505, UE 115-*j* may identify a schedule associated with the UE 115-*j* and the UE 115-*k*. The schedule may include an awake period reserved for directional communications between the UE 115-*j* and the UE 115-*k* (e.g., awake period reserved for uni-directional communications from the UE 115-*j* to the UE 115-*k*, or an awake period reserved for bi-directional communications between the UE 115-*j* and the UE 115-*k*, or a combination thereof). At 510, UE 115-*k* may identify a schedule associated with the UE 115-*k* and the UE 115-*j*. The schedule may include an awake period reserved for directional communications between the UE 115-*k* and the UE 115-*j* (e.g., an awake period reserved for uni-directional communications from the UE 115-*k* to the UE 115-*j* or from the UE 115-*j* to the UE 115-*k*, or an awake period reserved for bi-directional communications between the UE 115-*k* and the UE 115-*j*, or a combination thereof). At 515, the UE 115-*j* may transmit a request message to the UE 115-*k*. The UE 115-*j* may transmit the request message based on traffic information associated with the UE 115-*j*. According to examples of aspects described herein, the UE 115-*j* transmit the request message via UE signaling. The UE signaling may include, for example, PC5-RRC messages (e.g., option 1) or MAC control element (MAC CE) messages (e.g., option 2). In the example where the request message is a PC5-RRC message, the request message may include a cause indication (e.g., a reason for change) determined by the UE 115-*j*. The cause indication may include, for example, inactivity associated with the directional communications (e.g., one or more of the uni-directional communications or the bi-directional communications), or a traffic load associated with the UE 115-*j* that satisfies a threshold (e.g., a traffic load exceeding an expected traffic load).

In an example, the request message may include an impact period (e.g., number of cycles T associated with the change). For example, the impact period may include a number of cycles associated with modifying the awake period reserved for the directional communications (e.g., one or more of the awake periods reserved for the uni-directional communications or the awake period reserved for the bi-directional communications). In some examples, the request message may include a suggested size for a new awake period. For example, the size may include a duration (e.g., an adjusted duration) of the awake period reserved for the directional communications (e.g., one or more of the awake periods reserved for the uni-directional communications or the bi-directional communications). In some examples, the UE 115-*j* may assign a bit-value to a field in the request message. In an example, where the bit-value may correspond to the duration of the awake period reserved for the uni-directional communications, the UE 115-*j* may assign a bit-value of zero. In another example, where the bit-value may correspond to the duration of the awake period reserved for the bi-directional communications, the UE 115-*j* may assign a non-zero value.

At 520, the UE 115-*k* may transmit an response message to the UE 115-*j*. The UE 115-*k* may transmit the request message based on traffic information associated with the UE 115-*k* or the UE 115-*j*. According to examples of aspects described herein, the UE 115-*k* may transmit an response message via the UE signaling described herein. For example, the UE signaling may include, PC5-RRC messages (e.g., option 1) or MAC control element (MAC CE) messages (e.g., option 2). In the example where the response message is a PC5-RRC message, the response message may include a response code (e.g., accept, reject). For example, if accepted, the response message may include an acknowledgment (e.g., accept) associated with the request message. In another example, the response message may include a non-acknowledgment (e.g., reject) associated with the request message.

In an example, where the response message includes a non-acknowledgement, the response message may include a reason for the non-acknowledgement (e.g., a cause indication of the non-acknowledgement). For example, the UE 115-*j* may transmit a request message to the UE 115-*k* to modify an awake period reserved for directional communications between UE 115-*j* and UE 115-*k* (e.g., bi-directional communications between UE 115-*j* and UE 115-*k*), based on inactivity determined by the UE 115-*j* in association with transmitting from the UE 115-*j* to the UE 115-*k*. In an example where the UE 115-*k* may still have traffic associated with transmitting from the UE 115-*j* to the UE 115-*k*, the UE 115-*k* may transmit an response message including non-acknowledgement. In some examples, the response message may include additional actions. For example, the response message may include an indication of a free slot, for example, indicating no activity in the reverse direction (e.g., from the UE 115-*k* to the UE 115-*j*). In some examples, the signaling may be extended to increase the size (e.g., duration, number of slots) of the awake period reserved for the directional communications (e.g., one or more of the awake periods reserved for the uni-directional communications or the awake period reserved for the bi-directional communications).

At 525, the UE 115-*j* may manage the awake period reserved for the directional communications (e.g., one or more of the awake period reserved for the uni-directional communications or the awake period reserved for the bi-directional communications) based on traffic information associated with the UE 115-*j* or the response message. At 530, the UE 115-*k* may manage the awake period reserved for the directional communications (e.g., one or more of the awake periods reserved for the uni-directional communications or the awake period reserved for the bi-directional communications) based on traffic information associated with the UE 115-*k* or the UE 115-*j* or based on the request message. At 535, the UE 115-*j* and the UE 115-*k* may communicate with one another in accordance with the managing. According to examples of aspects herein, where the UE signaling as described includes uses MAC CE messages, examples of aspects of the process flow 500 may be similar. However, overall message size (e.g., UE signaling, request message, response message) may be limited. In some examples, the process flow 500 may include aggregation of MAC-CE messages with transmitted data.

Figure 6:
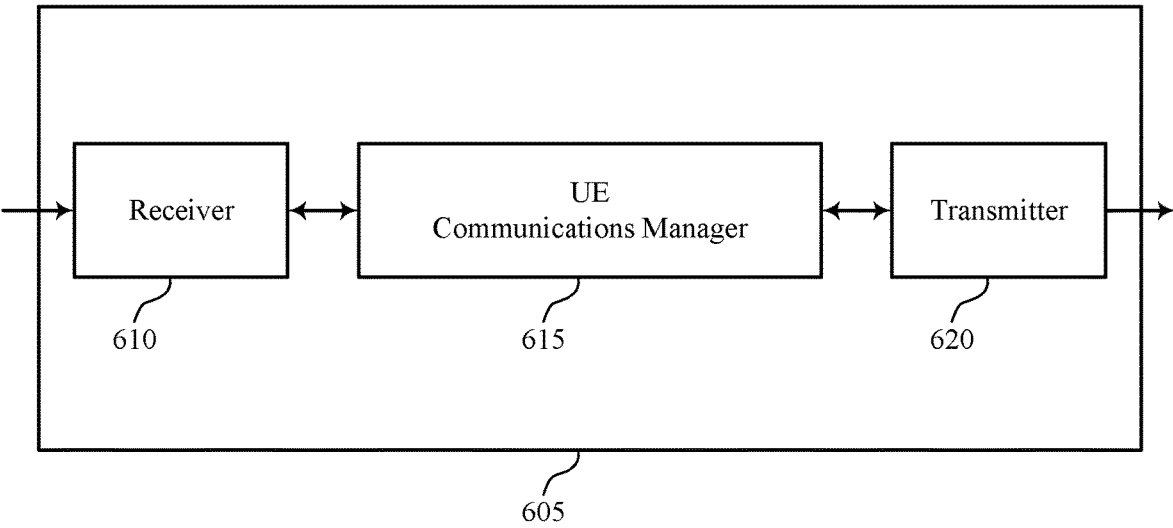
FIGS. 6 and 7 show block diagrams of devices that support methods of scheduling with inactivity in sidelink unicast in accordance with aspects of the present disclosure.
Figure 6:

FIG. 6 shows a block diagram 600 of a device 605 that supports methods of scheduling with inactivity in sidelink unicast in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to methods of scheduling with inactivity in sidelink unicast, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify a schedule associated with the device 605 and an additional device of a group of devices in direct communications with the device 605, where the schedule includes an awake period reserved for directional communications between the device 605 and the additional device (e.g., an awake period reserved for uni-directional communications from the device 605 to the additional device, or an awake period reserved for bi-directional communications between the device 605 and the additional device, or a combination thereof). The UE communications manager 615 may manage the awake period reserved for the directional communications (e.g., one or more of the awake period reserved for the uni-directional communications or the awake period reserved for the bi-directional communications) based on traffic information associated with the device 605, and communicate with the additional device in accordance with the managing.

The UE communications manager 615 may also identify a schedule associated with the device 605 and the additional device of the group of devices in direct communications with the device 605, where the schedule includes an awake period reserved for directional communications between the device 605 and the additional device (e.g., awake periods reserved for uni-directional communications from the device 605 to the additional device or from the additional device to the device 605, or an awake period reserved for bi-directional communications between the device 605 and the additional device, or a combination thereof), manage the awake period reserved for the directional communications (e.g., one or more of the awake periods reserved for the uni-directional communications or the awake period reserved for the bi-directional communications) based on traffic information associated with the device 605 or the additional device, and communicate with the additional device in accordance with the managing. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
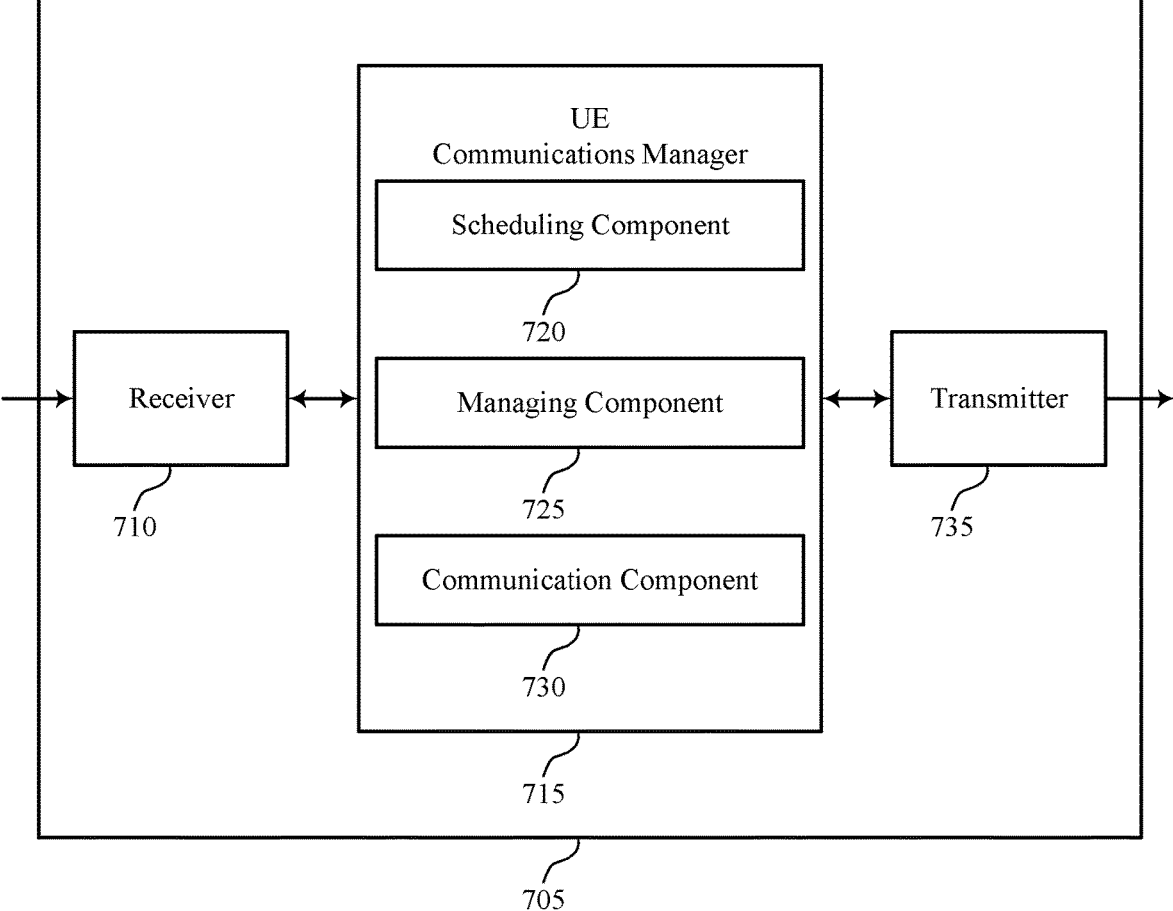

FIG. 7 shows a block diagram 700 of a device 705 that supports methods of scheduling with inactivity in sidelink unicast in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to methods of scheduling with inactivity in sidelink unicast, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a scheduling component 720, a managing component 725, and a communication component 730. The UE communications manager 715 may be an example of aspects of the UE communications manager 910 described herein.

The scheduling component 720 may identify a schedule associated with the device 705 and an additional device of a group of devices in direct communications with the device 705, where the schedule includes an awake period reserved for directional communications between the device 705 and the additional device (e.g., an awake period reserved for uni-directional communications from the device 705 to the additional device, or an awake period reserved for bi-directional communications between the device 705 and the additional device, or a combination thereof). In some examples, the scheduling component 720 may identify a schedule associated with the additional device and the device 705 of the group of devices in direct communications with the additional device, where the schedule includes an awake period reserved for directional communications between the device 705 and the additional device (e.g., awake periods reserved for uni-directional communications from the additional device to the device 705 or from the device 705 to the additional device, or an awake period reserved for bi-directional communications between the additional device and the device 705, or a combination thereof).

The managing component 725 may manage the awake period reserved for the directional communications (e.g., one or more of the awake period reserved for the uni-directional communications or the awake period reserved for the bi-directional communications) based on traffic information associated with the device 705. In some examples, the managing component 725 may manage the awake period reserved for the directional communications based on traffic information associated with the additional device or the device 705. The communication component 730 may communicate with the additional device in accordance with the managing. In some examples, the communication component 730 may communicate with the device in accordance with the managing.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
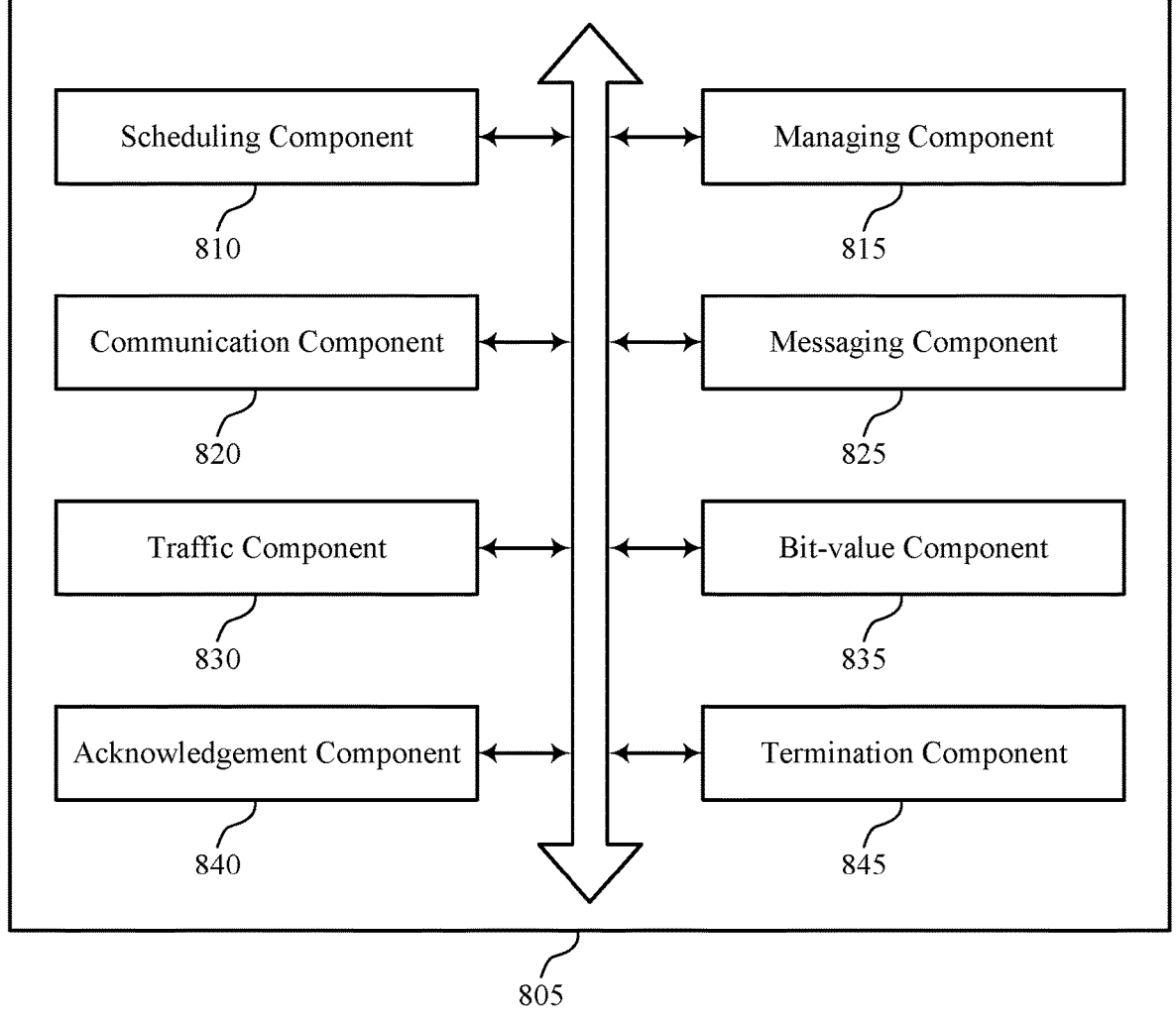
FIG. 8 shows a block diagram of a user equipment (UE) communications manager that supports methods of scheduling with inactivity in sidelink unicast in accordance with aspects of the present disclosure.

FIG. 8 shows a block diagram 800 of a UE communications manager 805 that supports methods of scheduling with inactivity in sidelink unicast in accordance with aspects of the present disclosure. The UE communications manager

805 may be an example of aspects of a UE communications manager 615, a UE communications manager 715, or a UE communications manager 910 described herein. The UE communications manager 805 may include a scheduling component 810, a managing component 815, a communication component 820, a messaging component 825, a traffic component 830, a bit-value component 835, an acknowledgement component 840, and a termination component 845. Each of these modules may communicate, directly or indirectly, with one another (e.g., via one or more buses).

The scheduling component 810 may identify a schedule associated with a device and an additional device of a group of devices in direct communications with the device, where the schedule includes an awake period reserved for directional communications between the device and the additional device (e.g., an awake period reserved for uni-directional communications from the device to the additional device, or an awake period reserved for bi-directional communications between the device and the additional device, or a combination thereof). In some examples, the scheduling component 810 may identify a schedule associated with the additional device and the device of the group of devices in direct communications with the additional device, where the schedule includes the awake period reserved for the directional communications (e.g., awake periods reserved for uni-directional communications from the additional device to the device or from the device to the additional device, or an awake period reserved for bi-directional communications between the additional device and the device, or a combination thereof). In some examples, the scheduling component 810 may determine an inactivity associated with the awake period reserved for the directional communications (e.g., one or more of the uni-directional communications or the bi-directional communications) based on the traffic information.

The managing component 815 may manage the awake period reserved for the directional communications (e.g., one or more of the awake period reserved for the uni-directional communications or the awake period reserved for the bi-directional communications based on traffic information associated with the device). In some examples, the managing component 815 may manage the awake period reserved for the directional communications (e.g., one or more of the awake periods reserved for the uni-directional communications or the awake period reserved for the bi-directional communications) based on traffic information associated with the additional device or the device. In some examples, the managing component 815 may manage the awake period reserved for the directional communications based on the response message. In some examples, the managing component 815 may manage the awake period reserved for the directional communications based on the inactivity.

In some examples, the managing component 815 may manage the awake period reserved for the directional communications (e.g., one or more of the awake period reserved for the uni-directional communications or the awake period reserved for the bi-directional communications) based on the traffic load satisfying the threshold. In some examples, the managing component 815 may manage the awake period reserved for the directional communications based on the comparing. In some examples, the managing component 815 may release one or more resources associated with the awake period reserved for the uni-directional communications based on the response message. In some examples, the managing component 815 may adjust a duration of the awake period reserved for the uni-directional communications based on the response message. In some examples, the managing component 815 may release one or more resources associated with the awake period reserved for the directional communications (e.g., the bi-directional communications) based on the response message.

In some examples, the managing component 815 may adjust a duration of the awake period reserved for the directional communications (e.g., the bi-directional communications) based on the response message. In some examples, the managing component 815 may allocate the awake period reserved for the directional communications (e.g., the bi-directional communications) exclusively to the additional device based on the response message. In some examples, the managing component 815 may release one or more resources associated with the awake period reserved for the uni-directional communications from the device to the additional device based on the terminating. In some examples, the managing component 815 may allocate the awake period reserved for the directional communications (e.g., the bi-directional communications) exclusively to the additional device based on the indication received from the device.

In some examples, the managing component 815 may manage the awake period reserved for the directional communications (e.g., one or more of the awake periods reserved for the uni-directional communications or the awake period reserved for the bi-directional communications) based on the request message and the traffic information associated with the additional device. In some examples, the managing component 815 may manage the awake period reserved for the directional communications based on an inactivity associated with the directional communications between the device and the additional device (e.g., one or more of the inactivity associated with the uni-directional communications from the device to the additional device, an inactivity associated with the uni-directional communications from the additional device to the device, or the inactivity associated with the bi-directional communications). In some examples, the managing component 815 may manage the awake period reserved for the directional communications based on an inactivity associated with the directional communications (e.g., an inactivity associated with the uni-directional communications from the device to the additional device).

In some examples, the managing component 815 may release one or more resources associated with the awake periods reserved for the directional communications (e.g., the uni-directional communications) based on the request message and the traffic information. In some examples, the managing component 815 may adjust a duration of one or more of the awake period reserved for the directional communications (e.g., the uni-directional communications from the additional device to the device or the awake period reserved for the uni-directional communications from the device to the additional device), based on the request message and the traffic information. In some examples, the managing component 815 may release one or more resources associated with the awake period reserved for the directional communications (e.g., the bi-directional communications) based on the request message and the traffic information. In some examples, the managing component 815 may adjust a duration of the awake period reserved for the directional communications (e.g., the bi-directional communications) based on the response message and the traffic information.

In some examples, the managing component 815 may allocate the awake period reserved for the directional communications (e.g., the bi-directional communications) exclusively to the additional device based on the request message and the traffic information. In some examples, the managing component 815 may release one or more resources associated with the awake period reserved for the directional communications between the additional device and the device (e.g., the uni-directional communications from the additional device to the device) based on the terminating. In some examples, the managing component 815 may allocate the awake period reserved for the directional communications (e.g., the bi-directional communications) exclusively to the device, based on the traffic information associated with the additional device or the device.

The communication component 820 may communicate with the additional device in accordance with the managing. In some examples, the communication component 820 may communicate with the additional device based on releasing the one or more resources associated with the awake period reserved for the uni-directional communication. In some cases, the awake period reserved for the directional communications (e.g., bi-directional communications) is shared between the device and the additional device. In some cases, the awake period reserved for the directional communications (e.g., uni-directional communications) is unshared between the device and the additional device.

In some examples, the communication component 820 may communicate with the additional UE based on the terminating. In some examples, the communication component 820 may communicate with the additional device based on an indication to modify the awake period reserved for the directional communications (e.g., uni-directional communication). In some cases, the communication component 820 may communicate with the additional device based on adjusting the duration of the awake period reserved for the directional communications (e.g., uni-directional communication). In some examples, the communication component 820 may communicate with the additional device based on an indication to remove the awake period reserved for the directional communications (e.g., bi-directional communications). In some cases, the communication component 820 may communicate with the additional device based on releasing the one or more resources associated with the awake period reserved for the directional communications (e.g., bi-directional communication). In some examples, the communication component 820 may communicate with the additional device based on an indication to adjust the awake period reserved for the directional communications (e.g., bi-directional communications). In some cases, the communication component 820 may communicate with the additional device based on adjusting the duration of the awake period reserved for the directional communications (e.g., bi-directional communication).

In some examples, the communication component 820 may communicate with the additional device based on an indication to allocate the awake period reserved for the directional communications (e.g., bi-directional communications) exclusively to the additional device. In some cases, the communication component 820 may communicate with the additional device based on allocating the awake period reserved for the directional communications (e.g., bi-directional communications) exclusively to the additional device. In some examples, the communication component 820 may communicate with the additional device based on an indication to allocate the awake period reserved for the directional communications (e.g., bi-directional communications) exclusively to the device. In some cases, the communication component 820 may communicate with the additional device based on allocating the awake period reserved for the directional communications (e.g., bi-directional communications) exclusively to the device. In some examples, the communication component 820 may communicate with the additional device based on the acknowledgment. In some examples, the communication component 820 may communicate with the additional device based on one or more of the non-acknowledgment or the cause indication of the non-acknowledgment.

In some examples, the communication component 820 may communicate with the device in accordance with the managing. In some examples, the communication component 820 may communicate with a third device in the group of devices in accordance with managing the awake period reserved for the directional communications (e.g., one or more of the awake periods reserved for the uni-directional communications or the awake period reserved for the bi-directional communications). In some examples, the communication component 820 may communicate with the device based on one or more of releasing the one or more resources associated with the awake periods reserved for the directional communications (e.g., uni-directional communication) and the response message. In some cases, the awake period reserved for the directional communications (e.g., bi-directional communications) is shared between the additional device and the device.

In some examples, the communication component 820 may communicate with the additional device based on an indication to allocate the awake period reserved for the directional communications (e.g., bi-directional communications) exclusively to the additional device. In some cases, the communication component 820 may communicate with the device based on the indication or based on allocating the awake period reserved for the directional communications (e.g., bi-directional communications) exclusively to the additional device. In some examples, the communication component 820 may communicate with the additional device based on an indication to adjust the duration of awake period reserved for the directional communications (e.g., uni-directional communications). In some cases, the communication component 820 may communicate with the device based on one or more of adjusting the duration of the awake period reserved for the directional communications (e.g., one or more of the awake periods reserved for the uni-directional communications) and the response message. In some examples, the communication component 820 may communicate with the device based on one or more of releasing the one or more resources associated with the awake period reserved for the directional communications (e.g., bi-directional communication) and the response message.

In some examples, the communication component 820 may communicate with the device based on one or more of adjusting the duration of the awake period reserved for the directional communications (e.g., bi-directional communication) and the response message. In some examples, the communication component 820 may communicate with the device based on allocating the awake period reserved for the directional communications (e.g., bi-directional communications) exclusively to the additional device and the response message. In some examples, the communication component 820 may communicate with the device based on allocating the awake period reserved for the directional communications (e.g., bi-directional communications) exclusively to the device. In some examples, the communication component 820 may communicate with the device based on the acknowledgment. In some examples, the communication component 820 may communicate with the device based on one or more of the non-acknowledgment or the cause indication of the non-acknowledgment.

The messaging component 825 may transmit a request message to the additional device based on the traffic information associated with the device. In some examples, the messaging component 825 may receive an response message from the additional device based on the request message. In some examples, the messaging component 825 may a cause indication in the request message based on the determining, the cause indication indicating the inactivity. In some examples, the messaging component 825 may include a cause indication in the request message based on the determining, the cause indication indicating that the traffic load associated with the device satisfies the threshold. In some examples, the messaging component 825 may include, in the request message, an indication to remove the awake period reserved for the directional communications (e.g., uni-directional communications) based on the traffic information.

In some examples, the messaging component 825 may include, in the request message, an indication to modify the awake period reserved for the directional communications (e.g., uni-directional communications) based on the traffic information. In some examples, the messaging component 825 may include, in the request message, an indication to remove the awake period reserved for the directional communications (e.g., bi-directional communications) based on the traffic information. In some examples, the messaging component 825 may include, in the request message, an indication to modify the awake period reserved for the directional communications (e.g., bi-directional communications) based on the traffic information. In some examples, the messaging component 825 may include, in the request message, an indication to allocate the awake period reserved for the directional communications (e.g., bi-directional communications) exclusively to the additional device based on the traffic information. In some examples, the messaging component 825 may receive, from the additional device, an indication to allocate the awake period reserved for the directional communications (e.g., bi-directional communications) exclusively to the device.

In some cases, one or more of the request message or the response message is a PC5 radio resource control message. In some cases, one or more of the request message or the response message is a medium access control-control element message. In some cases, the request message includes an indication of a number of cycles associated with modifying the awake period reserved for the directional communications. In some cases, the cause indication includes traffic information associated with the additional device or a number of available resources associated with the additional device for allocation to the device for the directional communications (e.g., bi-directional communications).

In some examples, the messaging component 825 may receive a request message from the device, the request message including the traffic information associated with the device. In some examples, the messaging component 825 may transmit an response message to the device based on the request message and the traffic information associated with the additional device. In some examples, the messaging component 825 may identify, in the request message, an indication to remove the awake periods reserved for the directional communications (e.g., uni-directional communications). In some examples, the messaging component 825 may include, in the response message, an acknowledgement associated with releasing the one or more resources associated with the awake periods reserved for the directional communications (e.g., uni-directional communications). In some examples, the messaging component 825 may identify, in the request message, an indication to modify the awake periods reserved for the directional communications (e.g., uni-directional communications).

In some examples, the messaging component 825 may include, in the response message, an acknowledgement associated with adjusting the duration of one or more of the awake periods reserved for the directional communications (e.g., uni-directional communications). In some examples, the messaging component 825 may identify, in the request message, an indication to remove the awake period reserved for the directional communications (e.g., bi-directional communications). In some examples, the messaging component 825 may identify, in the request message, an indication to modify the awake period reserved for the directional communications (e.g., bi-directional communications). In some examples, the messaging component 825 may identify, in the request message, an indication to allocate the awake period reserved for the directional communications (e.g., bi-directional communications) exclusively to the additional device. In some examples, the messaging component 825 may transmit, to the device, an indication associated with allocating the awake period reserved for the directional communications (e.g., bi-directional communications) exclusively to the device.

In some cases, one or more of the request message or the response message is a PC5 radio resource control message. In some cases, one or more of the request message or the response message is a medium access control-control element message. In some cases, the request message includes an indication of a number of cycles associated with modifying the awake period reserved for the directional communications. In some cases, the request message carries a cause indication indicating an inactivity associated with the directional communications (e.g., one or more of the uni-directional communications from the device to the additional device or the bi-directional communications) and at least the traffic information associated with the device. In some cases, the request message carries a cause indication indicating that a traffic load associated with the device satisfies a threshold based on the traffic information associated with the device. In some cases, the cause indication includes the traffic information associated with the additional device or a number of available resources associated with the additional device for allocation to the device for the directional communications (e.g., bi-directional communications).

The traffic component 830 may determine that a traffic load associated with the device satisfies a threshold based on the traffic information. In some examples, the traffic component 830 may compare the traffic load associated with the device to a predicted traffic load associated with the device. The bit-value component 835 may assign bit-value to a field in the request message, where the bit-value corresponds to the duration of the awake period reserved for the directional communications (e.g., uni-directional communications). In some examples, the bit-value component 835 may assign bit-value to a field in the request message, where the bit-value corresponds to the duration of the awake period reserved for the directional communications (e.g., bi-directional communications). In some examples, the bit-value component 835 may identify a bit-value assigned to a field in the request message, where the bit-value corresponds to the duration of the awake period reserved for the directional communications (e.g., bi-directional communications). The acknowledgement component 840 may identify, in the response message, an acknowledgment associated with the request message. In some examples, the acknowledgement component 840 may identify, in the response message, a non-acknowledgment associated with the request message and a cause indication of the non-acknowledgment.

In some examples, the acknowledgement component 840 may include, in the response message, an acknowledgement associated with releasing the one or more resources associated with the awake period for the directional communications (e.g., bi-directional communications). In some examples, the acknowledgement component 840 may include, in the response message, an acknowledgement associated with adjusting the duration of the awake period reserved for the directional communications (e.g., bi-directional communications). In some examples, the acknowledgement component 840 may include, in the response message, an acknowledgement associated with allocating the awake period reserved for the directional communications (e.g., bi-directional communications) exclusively to the additional device.

In some examples, the acknowledgement component 840 may include, in the response message, an acknowledgment associated with the request message, based on the traffic information. In some examples, the acknowledgement component 840 may include, in the response message, a non-acknowledgment associated with the request message and a cause indication of the non-acknowledgment, based on the traffic information. The termination component 845 may terminate a unicast link associated with the directional communications (e.g., uni-directional communications) based on the traffic information. In some examples, the termination component 845 may terminate a unicast link associated with the directional communications (e.g., uni-directional communications) based on the traffic information.

Figure 9:
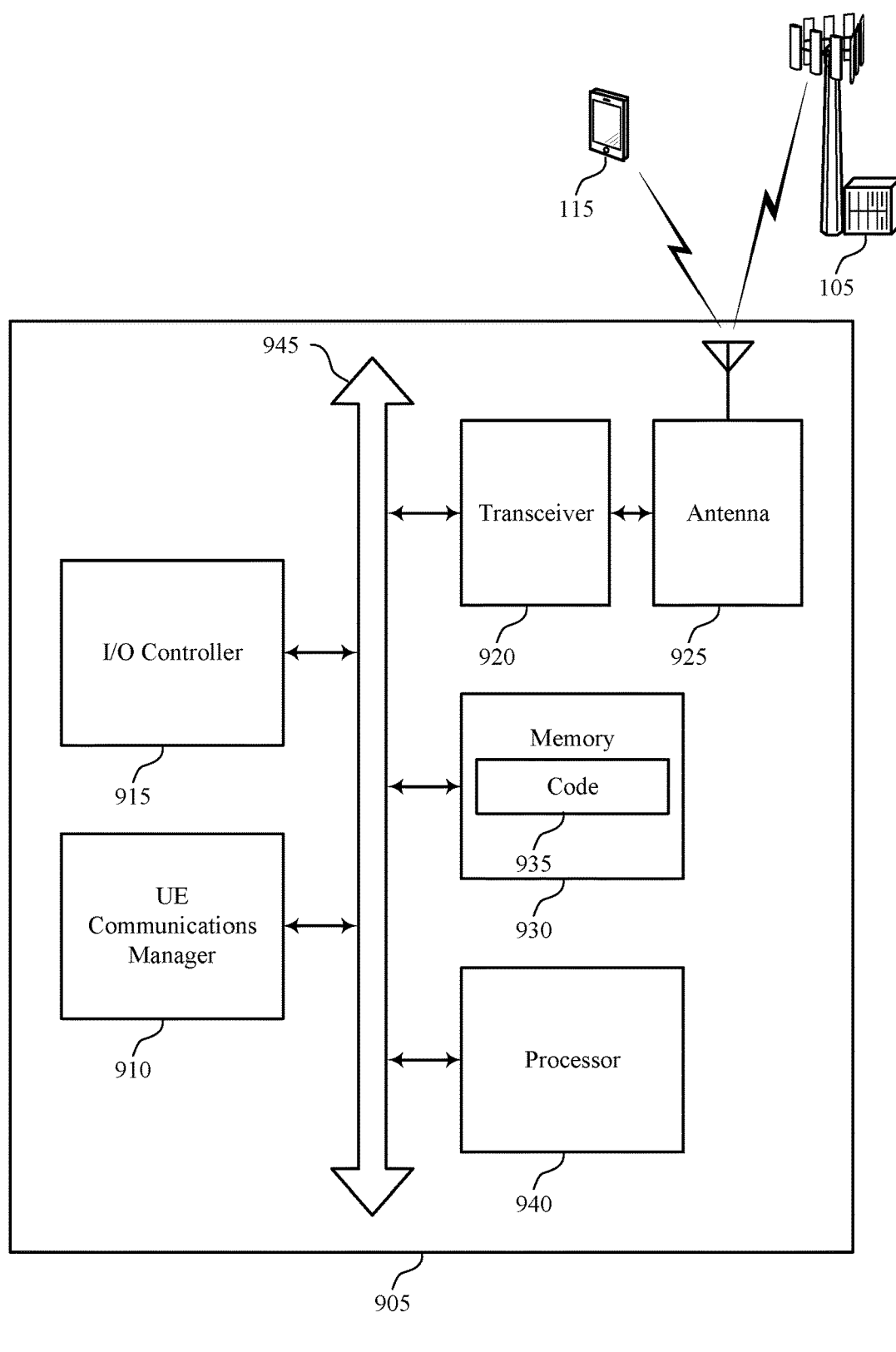
FIG. 9 shows a diagram of a system including a device that supports methods of scheduling with inactivity in sidelink unicast in accordance with aspects of the present disclosure.

FIG. 9 shows a diagram of a system 900 including a device 905 that supports methods of scheduling with inactivity in sidelink unicast in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify a schedule associated with the device 905 and an additional device of a group of devices in direct communications with the device 905, where the schedule includes an awake period reserved for directional communications between the device 905 and the additional device (e.g., an awake period reserved for uni-directional communications from the device 905 to the additional device, or an awake period reserved for bi-directional communications between the device 905 and the additional device, or a combination thereof), manage the awake period reserved for the directional communications based on traffic information associated with the device 905, and communicate with the additional device in accordance with the managing.

The UE communications manager 910 may also identify a schedule associated with the device 905 and a device of a group of devices in direct communications with the additional device, where the schedule includes an awake period reserved for directional communications between the device 905 and the additional device (e.g., awake periods reserved for uni-directional communications from the device 905 to the device or from the additional device to the device 905, or an awake period reserved for bi-directional communications between the device 905 and the device, or a combination thereof), manage the awake period reserved for the directional communications based on traffic information associated with the device 905 or the device, and communicate with the device in accordance with the managing.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting methods of scheduling with inactivity in sidelink unicast).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a flowchart illustrating a method 1000 that supports methods of scheduling with inactivity in sidelink unicast in accordance with aspects of the present disclosure. The operations of method 1000 may be implemented by a UE 115 or its components as described herein. For example, the operations of method 1000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, a first UE may identify a schedule associated with the first UE and a second UE of a group of UEs in direct communications with the first UE, where the schedule includes an awake period reserved for directional communications between the first UE and the second UE (e.g., an awake period reserved for uni-directional communications from the first UE to the second UE, or an awake period reserved for bi-directional communications between the first UE and the second UE, or a combination thereof). The operations of 1005 may be performed according to the methods described herein. In some examples, aspects of the operations of 1005 may be performed by a scheduling component as described with reference to FIGS. 6 through 9.

At 1010, the first UE may manage the awake period reserved for the directional communications based on traffic information associated with the first UE. The operations of 1010 may be performed according to the methods described herein. In some examples, aspects of the operations of 1010 may be performed by a managing component as described with reference to FIGS. 6 through 9.

At 1015, the first UE may communicate with the second UE in accordance with the managing. The operations of 1015 may be performed according to the methods described herein. In some examples, aspects of the operations of 1015 may be performed by a communication component as described with reference to FIGS. 6 through 9.

FIG. 11 shows a flowchart illustrating a method 1100 that supports methods of scheduling with inactivity in sidelink unicast in accordance with aspects of the present disclosure. The operations of method 1100 may be implemented by a UE 115 or its components as described herein. For example, the operations of method 1100 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, a first UE may identify a schedule associated with a first UE and a second UE of a group of UEs in direct communications with the first UE, where the schedule includes an awake period reserved for directional communications between the first UE and the second UE (e.g., an awake period reserved for uni-directional communications from the first UE to the second UE, or an awake period reserved for bi-directional communications between the first UE and the second UE, or a combination thereof). The operations of 1105 may be performed according to the methods described herein. In some examples, aspects of the operations of 1105 may be performed by a scheduling component as described with reference to FIGS. 6 through 9.

At 1110, the first UE may transmit a request message to the second UE based on the traffic information associated with the first UE. The operations of 1110 may be performed according to the methods described herein. In some examples, aspects of the operations of 1110 may be performed by a messaging component as described with reference to FIGS. 6 through 9.

At 1115, the first UE may receive an response message from the second UE based on the request message. The operations of 1115 may be performed according to the methods described herein. In some examples, aspects of the operations of 1115 may be performed by a messaging component as described with reference to FIGS. 6 through 9.

At 1120, the first UE may manage the awake period reserved for the directional communications (e.g., one or more of the awake period reserved for the uni-directional communications or the awake period reserved for the bi-directional communications) based on traffic information associated with the first UE and the response message. The operations of 1120 may be performed according to the methods described herein. In some examples, aspects of the operations of 1120 may be performed by a managing component as described with reference to FIGS. 6 through 9.

At 1125, the first UE may communicate with the second UE in accordance with the managing. The operations of 1125 may be performed according to the methods described herein. In some examples, aspects of the operations of 1125 may be performed by a communication component as described with reference to FIGS. 6 through 9.

FIG. 12 shows a flowchart illustrating a method 1200 that supports methods of scheduling with inactivity in sidelink unicast in accordance with aspects of the present disclosure. The operations of method 1200 may be implemented by a UE 115 or its components as described herein. For example, the operations of method 1200 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, a first UE may identify a schedule associated with the first UE and a second UE of a group of UEs in direct communications with the first UE, where the schedule includes an awake period reserved for directional communications between the first UE and the second UE (e.g., awake periods reserved for uni-directional communications from the first UE to the second UE or from the second UE to the first UE, or an awake period reserved for bi-directional communications between the first UE and the second UE, or a combination thereof). The operations of 1205 may be performed according to the methods described herein. In some examples, aspects of the operations of 1205 may be performed by a scheduling component as described with reference to FIGS. 6 through 9.

At 1210, the first UE may manage the awake period reserved for the directional communications (e.g., one or more of the awake periods reserved for the uni-directional communications or the awake period reserved for the bi-directional communications) based on traffic information associated with the first UE or the second UE. The operations of 1210 may be performed according to the methods described herein. In some examples, aspects of the operations of 1210 may be performed by a managing component as described with reference to FIGS. 6 through 9.

At 1215, the first UE may communicate with the second UE in accordance with the managing. The operations of 1215 may be performed according to the methods described herein. In some examples, aspects of the operations of 1215 may be performed by a communication component as described with reference to FIGS. 6 through 9.

FIG. 13 shows a flowchart illustrating a method 1300 that supports methods of scheduling with inactivity in sidelink unicast in accordance with aspects of the present disclosure. The operations of method 1300 may be implemented by a UE 115 or its components as described herein. For example, the operations of method 1300 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, a first UE may identify a schedule associated with the first UE and a second UE of a group of UEs in direct communications with the first UE, where the schedule includes an awake period reserved for directional communications between the first UE and the second UE (e.g., awake periods reserved for uni-directional communications from the first UE to the second UE or from the second UE to the first UE, or an awake period reserved for bi-directional communications between the first UE and the second UE, or a combination thereof). The operations of 1305 may be performed according to the methods described herein. In some examples, aspects of the operations of 1305 may be performed by a scheduling component as described with reference to FIGS. 6 through 9.

At 1310, the first UE may receive a request message from the second UE, the request message including the traffic information associated with the second UE. The operations of 1310 may be performed according to the methods described herein. In some examples, aspects of the operations of 1310 may be performed by a messaging component as described with reference to FIGS. 6 through 9.

At 1315, the first UE may transmit an response message to the second UE based on the request message and the traffic information associated with the first UE. The operations of 1315 may be performed according to the methods described herein. In some examples, aspects of the operations of 1315 may be performed by a messaging component as described with reference to FIGS. 6 through 9.

At 1320, the first UE may manage the awake period reserved for the directional communications (e.g., one or more of the awake periods reserved for the uni-directional communications or the awake period reserved for the bi-directional communications) based on the request message and traffic information associated with the first UE or the second UE. The operations of 1320 may be performed according to the methods described herein. In some examples, aspects of the operations of 1320 may be performed by a managing component as described with reference to FIGS. 6 through 9.

At 1325, the first UE may communicate with the second UE in accordance with the managing. The operations of 1325 may be performed according to the methods described herein. In some examples, aspects of the operations of 1325 may be performed by a communication component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:

identifying a schedule associated with the first UE in direct communications with a second UE, the schedule comprising an awake period reserved for transmitting or receiving uni-directional communications;

determining the awake period of a discontinuous reception configuration associated with transmitting or receiving the uni-directional communications, wherein the discontinuous reception configuration is for at least one discontinuous reception cycle controlled by a set of timers associated with the first UE, and wherein the awake period of the discontinuous reception configuration is based at least in part on a traffic load associated with slots used for transmissions by the first UE and a predicted sidelink traffic load between the first UE and one or more other UEs including the second UE; and communicating with the second UE in accordance with the discontinuous reception configuration.

2. The method of claim 1, further comprising:

transmitting a request message to the second UE based at least in part on traffic information associated with the first UE; and receiving a response message from the second UE based at least in part on the request message, wherein the discontinuous reception configuration associated with transmitting or receiving the uni-directional communications is based at least in part on the response message.

3. The method of claim 2, wherein one or more of the request message or the response message is a PC5 radio resource control message or a medium access control-control element message.

4. The method of claim 2, wherein the request message comprises an indication of a quantity of cycles associated with modifying the awake period reserved for transmitting or receiving the uni-directional communications.

5. The method of claim 2, further comprising:
determining that the traffic load associated with the first UE satisfies a threshold based at least in part on the traffic information, wherein the discontinuous reception configuration associated with transmitting or receiving the uni-directional communications is based at least in part on the traffic load satisfying the threshold; and
including a cause indication in the request message based at least in part on the determining, the cause indication indicating that the traffic load associated with the first UE satisfies the threshold, wherein transmitting the request message to the second UE comprises:
transmitting, to the second UE, the request message carrying the cause indication.

6. The method of claim 2, further comprising:
including, in the request message, an indication to remove the awake period reserved for transmitting or receiving the uni-directional communications based at least in part on the traffic information, wherein communicating with the second UE is based at least in part on the indication.

7. The method of claim 2, further comprising:
including, in the request message, an indication to modify the awake period reserved for transmitting or receiving the uni-directional communications based at least in part on the traffic information, wherein communicating with the second UE is based at least in part on the indication.

8. The method of claim 2, further comprising:
assigning a bit-value to a field in the request message, wherein the bit-value corresponds to a duration of the awake period reserved for transmitting or receiving the uni-directional communications.

9. The method of claim 2, further comprising:
including, in the request message, an indication to remove or modify the awake period reserved for transmitting or receiving the uni-directional communications based at least in part on the traffic information, wherein communicating with the second UE is based at least in part on the indication.

10. The method of claim 2, further comprising:
assigning a bit-value to a field in the request message, wherein the bit-value corresponds to a duration of the awake period reserved for transmitting or receiving the uni-directional communications.

11. The method of claim 2, further comprising:
including, in the request message, an indication to allocate the awake period reserved for transmitting or receiving the uni-directional communications exclusively to the second UE based at least in part on the traffic information, wherein communicating with the second UE is based at least in part on the indication.

12. The method of claim 2, further comprising:
including, in the request message, an indication to remove the awake period reserved for transmitting or receiving the uni-directional communications for a single cycle after a current cycle based at least in part on the traffic information, wherein communicating with the second UE is based at least in part on the indication.

13. The method of claim 1, wherein the awake period reserved for transmitting or receiving the uni-directional communications comprises sidelink unicast from the first UE to the second UE and wherein the awake period reserved for the uni-directional communications is unshared between the first UE and the second UE.

14. The method of claim 1, further comprising:
receiving, from the second UE, an indication to allocate the awake period reserved for transmitting or receiving the uni-directional communications exclusively to the first UE, wherein communicating with the second UE is based at least in part on the indication.

15. The method of claim 1, further comprising:
transmitting a first message to the second UE comprising an indication of a duration of the awake period reserved for the uni-directional communications; and
receiving, in response to the first message, a second message from the second UE indicating acceptance of or rejection of the awake period, wherein communicating with the second UE in accordance with the discontinuous reception configuration is based at least in part on the second message.

16. The method of claim 1, further comprising:
estimating an amount of resources that the first UE uses for communications between the first UE and the one or more other UEs including the second UE, the predicted sidelink traffic load corresponding to the amount of resources.

17. A method for wireless communications at a first user equipment (UE), comprising:
identifying a schedule associated with the first UE in direct communications with a second UE, the schedule comprising an awake period reserved for transmitting or receiving uni-directional communications;
determining the awake period of a discontinuous reception configuration associated with transmitting or receiving the uni-directional communications based at least in part on traffic information associated with the first UE or the second UE, wherein the discontinuous reception configuration is for at least one discontinuous reception cycle controlled by a set of timers associated with the first UE, and wherein the awake period of the discontinuous reception configuration is based at least in part on a traffic load associated with slots used for transmissions by the first UE and a predicted sidelink traffic load between the first UE and one or more other UEs including the second UE; and
communicating with the second UE in accordance with the discontinuous reception configuration.

18. The method of claim 17, further comprising:
receiving a request message from the second UE, the request message comprising the traffic information associated with the second UE; and
transmitting a response message to the second UE based at least in part on the request message and the traffic information associated with the first UE, wherein the discontinuous reception configuration associated with transmitting or receiving the uni-directional communications is based at least in part on the request message and the traffic information associated with the first UE.

19. The method of claim 18, wherein one or more of the request message or the response message is a PC5 radio resource control message or a medium access control-control element message.

20. The method of claim 18, wherein the request message comprises an indication of a quantity of cycles associated with modifying the awake period reserved for transmitting or receiving the uni-directional communications.

21. The method of claim 18, wherein the request message carries a cause indication indicating that a first traffic load associated with the second UE satisfies a threshold based at least in part on the traffic information associated with the second UE, and wherein the discontinuous reception configuration associated with transmitting or receiving the uni-directional communications is based at least in part on an inactivity associated with the uni-directional communications between the second UE and the first UE.

22. The method of claim 18, further comprising:

identifying, in the request message, an indication to remove the awake period reserved for transmitting or receiving the uni-directional communications;

releasing one or more resources associated with the awake period reserved for transmitting or receiving the uni-directional communications based at least in part on the request message and the traffic information; and including, in the response message, an acknowledgement associated with releasing the one or more resources associated with the awake period reserved for transmitting or receiving the uni-directional communications, wherein communicating with the second UE is based at least in part on one or more of releasing the one or more resources associated with the awake period reserved for transmitting or receiving the uni-directional communications and the response message.

23. The method of claim 18, further comprising:

identifying, in the request message, an indication to modify the awake period reserved for transmitting or receiving the uni-directional communications; and including, in the response message, an acknowledgement associated with adjusting a duration of the awake period reserved for transmitting or receiving the uni-directional communications, wherein communicating with the second UE is based at least in part on the response message.

24. The method of claim 18, further comprising:

identifying one or more bit-values assigned to a field in the request message, wherein the one or more bit-values correspond to a duration of the awake period reserved for transmitting or receiving the uni-directional communications.

25. The method of claim 18, further comprising:

identifying, in the request message, an indication to remove or modify the awake period reserved for transmitting or receiving the uni-directional communications; and including, in the response message, an acknowledgement associated with releasing one or more resources associated with the awake period for transmitting or receiving the uni-directional communications, wherein communicating with the second UE is based at least in part on the response message.

26. The method of claim 18, further comprising:

identifying a bit-value assigned to a field in the request message, wherein the bit-value corresponds to a duration of the awake period reserved for transmitting or receiving the uni-directional communications.

27. The method of claim 18, further comprising:

identifying, in the request message, an indication to allocate the awake period reserved for transmitting or receiving the uni-directional communications exclusively to the first UE; and including, in the response message, an acknowledgement associated with allocating the awake period reserved for transmitting or receiving the uni-directional communications exclusively to the first UE, wherein communicating with the second UE is based at least in part on the response message.

28. The method of claim 17, further comprising:

communicating with a third UE in accordance with the discontinuous reception configuration associated with transmitting or receiving the uni-directional communications.

29. The method of claim 17, wherein the awake period reserved for transmitting or receiving the uni-directional communications comprises sidelink unicast from the first UE to the second UE and wherein the awake period reserved for the uni-directional communications is unshared between the first UE and the second UE.

30. The method of claim 17, further comprising:

transmitting, to the second UE, an indication associated with allocating the awake period reserved for transmitting or receiving the uni-directional communications exclusively to the second UE, wherein communicating with the second UE is based at least in part on the indication.

31. A first apparatus for wireless communications, comprising:

one or more processors, and at least one memory coupled with the one or more processors, the one or more processors configured to:

identify a schedule associated with the first apparatus in direct communications with a second apparatus, the schedule comprising an awake period reserved for transmitting or receiving uni-directional communications;

determine the awake period of a discontinuous reception configuration associated with transmitting or receiving the uni-directional communications, wherein the discontinuous reception configuration is for at least one discontinuous reception cycle controlled by a set of timers associated with the first apparatus, and wherein the awake period of the discontinuous reception configuration is based at least in part on a traffic load associated with slots used for transmissions by the first apparatus and a predicted sidelink traffic load between the first apparatus and one or more other apparatuses including the second apparatus; and communicate with the second apparatus in accordance with the discontinuous reception configuration.

32. The first apparatus of claim 31, wherein the one or more processors are configured to cause the first apparatus to:

transmit a request message to the second apparatus based at least in part on traffic information associated with the first apparatus; and receive a response message from the second apparatus based at least in part on the request message, wherein the awake period reserved for transmitting or receiving the uni-directional communications is based at least in part on the response message.

33. The first apparatus of claim 32, wherein one or more of the request message or the response message is a PC5 radio resource control message or a medium access control-control element message.

34. The first apparatus of claim 32, wherein the request message comprises an indication of a quantity of cycles associated with modifying the awake period reserved for transmitting or receiving the uni-directional communications.

35. The first apparatus of claim 32, wherein the one or more processors are configured to cause the first apparatus to:

determine that the traffic load associated with the first apparatus satisfies a threshold based at least in part on the traffic information, wherein the awake period reserved for transmitting or receiving the uni-directional communications is based at least in part on the traffic load satisfying the threshold; and include a cause indication in the request message based at least in part on the traffic load associated with the first apparatus satisfying the threshold, the cause indication indicating that the traffic load associated with the first apparatus satisfies the threshold, wherein, to transmit the request message, the one or more processors are configured to cause the first apparatus to:

transmit, to the second apparatus, the request message carrying the cause indication.

36. The first apparatus of claim 32, wherein the one or more processors are configured to cause the first apparatus to:

include, in the request message, an indication to remove the awake period reserved for transmitting or receiving the uni-directional communications based at least in part on the traffic information, wherein communication with the second apparatus is based at least in part on the indication.

37. The first apparatus of claim 32, wherein the one or more processors are configured to cause the first apparatus to:

include, in the request message, an indication to modify the awake period reserved for transmitting or receiving the uni-directional communications based at least in part on the traffic information, wherein communication with the second apparatus is based at least in part on the indication.

38. The first apparatus of claim 32, wherein the one or more processors are configured to cause the first apparatus to:

assign a bit-value to a field in the request message, wherein the bit-value corresponds to a duration of the awake period reserved for transmitting or receiving the uni-directional communications.

39. The first apparatus of claim 32, wherein the one or more processors are configured to cause the first apparatus to:

include, in the request message, an indication to remove or modify the awake period reserved for transmitting or receiving the uni-directional communications based at least in part on the traffic information, wherein communication with the second apparatus is based at least in part on the indication.

40. The first apparatus of claim 32, wherein the one or more processors are configured to cause the first apparatus to:

assign a bit-value to a field in the request message, wherein the bit-value corresponds to a duration of the awake period reserved for transmitting or receiving the uni-directional communications.

41. The first apparatus of claim 32, wherein the one or more processors are configured to cause the first apparatus to:

include, in the request message, an indication to allocate the awake period reserved for transmitting or receiving the uni-directional communications exclusively to the second apparatus based at least in part on the traffic information, wherein communication with the second apparatus is based at least in part on the indication.

42. The first apparatus of claim 31, wherein the awake period reserved for transmitting or receiving the uni-directional communications comprises sidelink unicast from the first apparatus to the second apparatus and wherein the awake period reserved for the uni-directional communications is unshared between the first apparatus and the second apparatus.

43. The first apparatus of claim 31, wherein the one or more processors are configured to cause the first apparatus to:

receive, from the second apparatus, an indication to allocate the awake period reserved for transmitting or receiving the uni-directional communications exclusively to the first apparatus, wherein communication with the second apparatus is based at least in part on the indication.

44. The first apparatus of claim 31, wherein the one or more processors are configured to cause the first apparatus to:

transmit a first message to the second apparatus comprising an indication of a duration of the awake period reserved for the uni-directional communications; and receive, in response to the first message, a second message from the second apparatus indicating acceptance of or rejection of the awake period, wherein communicating with the second apparatus in accordance with the discontinuous reception configuration is based at least in part on the second message.

45. A first apparatus for wireless communications, comprising:

one or more processors, and at least one memory coupled with the one or more processors, the one or more processors configured to:

identify a schedule associated with the first apparatus in direct communications with a second apparatus, the schedule comprising an awake period reserved for transmitting or receiving uni-directional communications;

determine the awake period of a discontinuous reception configuration associated with transmitting or receiving the uni-directional communications based at least in part on traffic information associated with the first apparatus or the second apparatus, wherein the discontinuous reception configuration is for at least one discontinuous reception cycle controlled by a set of timers associated with the first apparatus, and wherein the awake period of the discontinuous reception configuration is based at least in part on a traffic load associated with slots used for transmissions by the first apparatus and a predicted sidelink traffic load between the first apparatus and one or more other apparatuses including the second apparatus; and communicate with the second apparatus in accordance with the discontinuous reception configuration.

46. The first apparatus of claim 45, wherein the one or more processors are configured to cause the first apparatus to:

receive a request message from the second apparatus, the request message comprising the traffic information associated with the second apparatus; and transmit a response message to the second apparatus based at least in part on the request message and the traffic information associated with the first apparatus, wherein the awake period reserved for transmitting or receiving the uni-directional communications is based at least in part on the request message and the traffic information associated with the first apparatus.

47. The first apparatus of claim 46, wherein one or more of the request message or the response message is a PC5 radio resource control message or a medium access control-control element message.

48. The first apparatus of claim 46, wherein the request message comprises an indication of a quantity of cycles associated with modifying the awake period reserved for transmitting or receiving the uni-directional communications.

49. The first apparatus of claim 46, wherein the request message carries a cause indication indicating that a first traffic load associated with the second apparatus satisfies a threshold based at least in part on the traffic information associated with the second apparatus, and wherein the awake period reserved for transmitting or receiving the uni-directional communications is based at least in part on an inactivity associated with the uni-directional communications between the second apparatus and the first apparatus.

50. The first apparatus of claim 46, wherein the one or more processors are configured to cause the first apparatus to:

identify, in the request message, an indication to remove the awake period reserved for transmitting or receiving the uni-directional communications;

releasing one or more resources associated with the awake period reserved for transmitting or receiving the uni-directional communications based at least in part on the request message and the traffic information; and including, in the response message, an acknowledgement associated with releasing the one or more resources associated with the awake period reserved for transmitting or receiving the uni-directional communications, wherein communication with the second apparatus is based at least in part on one or more of releasing the one or more resources associated with the awake period reserved for transmitting or receiving the uni-directional communications and the response message.

51. The first apparatus of claim 46, wherein the one or more processors are configured to cause the first apparatus to:

identify, in the request message, an indication to modify the awake period reserved for transmitting or receiving the uni-directional communications; and include, in the response message, an acknowledgement associated with adjusting a duration of the awake period reserved for transmitting or receiving the uni-directional communications, wherein communication with the second apparatus is based at least in part on the response message.

52. The first apparatus of claim 46, wherein the one or more processors are configured to cause the first apparatus to:

identify one or more bit-values assigned to a field in the request message, wherein the one or more bit-values correspond to a duration of the awake period reserved for transmitting or receiving the uni-directional communications.

53. The first apparatus of claim 46, wherein the one or more processors are configured to cause the first apparatus to:

identify, in the request message, an indication to remove or modify the awake period reserved for transmitting or receiving the uni-directional communications; and include, in the response message, an acknowledgement associated with releasing one or more resources associated with the awake period for transmitting or receiving the uni-directional communications, wherein communication with the second apparatus is based at least in part on the response message.

54. The first apparatus of claim 46, wherein the one or more processors are configured to cause the first apparatus to:

identify a bit-value assigned to a field in the request message, wherein the bit-value corresponds to a duration of the awake period reserved for transmitting or receiving the uni-directional communications.

55. The first apparatus of claim 46, wherein the one or more processors are configured to cause the first apparatus to:

identify, in the request message, an indication to allocate the awake period reserved for transmitting or receiving the uni-directional communications exclusively to the first apparatus; and include, in the response message, an acknowledgement associated with allocating the awake period reserved for transmitting or receiving the uni-directional communications exclusively to the first apparatus, wherein communication with the second apparatus is based at least in part on the response message.

56. The first apparatus of claim 45, wherein the one or more processors are configured to cause the first apparatus to:

communicate with a third apparatus in accordance with the discontinuous reception configuration associated with transmitting or receiving the uni-directional communications.

57. The first apparatus of claim 45, wherein the awake period reserved for transmitting or receiving the uni-directional communications comprises sidelink unicast from the first apparatus to the second apparatus and wherein the awake period reserved for the uni-directional communications is unshared between the first apparatus and the second apparatus.

58. The first apparatus of claim 45, wherein the one or more processors are configured to cause the first apparatus to:

transmit, to the second apparatus, an indication associated with allocating the awake period reserved for transmitting or receiving the uni-directional communications exclusively to the second apparatus, wherein communication with the second apparatus is based at least in part on the indication.

\* \* \* \* \*